(12) United States Patent
Horiuchi et al.

(10) Patent No.: US 9,334,005 B2
(45) Date of Patent: May 10, 2016

(54) FRONT STRUCTURE OF MOTORCYCLE

(71) Applicant: HONDA MOTOR CO., LTD., Tokyo (JP)

(72) Inventors: Tetsu Horiuchi, Wako (JP); Kanta Yamamoto, Wako (JP); Tomokatsu Suda, Wako (JP); Kazuo Sato, Wako (JP); Tomofumi Kuramitsu, Wako (JP); Toshio Miura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/661,437

(22) Filed: Mar. 18, 2015

(65) Prior Publication Data

US 2015/0266532 A1 Sep. 24, 2015

(30) Foreign Application Priority Data

Mar. 19, 2014 (JP) .................. 2014-057144

(51) Int. Cl.
| | |
|---|---|
| *B62J 17/02* | (2006.01) |
| *B62J 17/04* | (2006.01) |
| *B62J 23/00* | (2006.01) |
| *B62K 11/02* | (2006.01) |
| *B62K 21/12* | (2006.01) |
| *B62J 17/00* | (2006.01) |
| *B62J 17/06* | (2006.01) |
| *B62J 35/00* | (2006.01) |
| *B62K 19/46* | (2006.01) |
| *B62J 99/00* | (2009.01) |

(52) U.S. Cl.
CPC *B62J 17/04* (2013.01); *B62J 17/00* (2013.01); *B62J 17/02* (2013.01); *B62J 17/06* (2013.01); *B62J 23/00* (2013.01); *B62J 35/00* (2013.01); *B62K 11/02* (2013.01); *B62K 19/46* (2013.01); *B62K 21/12* (2013.01); *B62J 2099/004* (2013.01); *B62K 2202/00* (2013.01)

(58) Field of Classification Search
CPC ............. B62J 17/02; B62J 17/04; B62J 23/00
USPC .............. 296/77.1, 78.1, 91, 180.1, 208, 84.1
See application file for complete search history.

(56) References Cited

U.S. PATENT DOCUMENTS

| | | | | |
|---|---|---|---|---|
| 8,899,668 | B2 * | 12/2014 | Yokouchi ................. | B62J 17/00 296/180.1 |
| 2005/0110295 | A1 * | 5/2005 | Takemura ................ | B62J 17/04 296/78.1 |
| 2008/0185865 | A1 * | 8/2008 | Matsuo .................... | B62J 17/04 296/78.1 |
| 2009/0108621 | A1 * | 4/2009 | Matsuo .................... | B62J 17/04 296/91 |
| 2009/0195011 | A1 * | 8/2009 | Tsuda ...................... | B62J 17/04 296/78.1 |
| 2012/0104787 | A1 * | 5/2012 | Tsukui ..................... | B62J 17/04 296/78.1 |
| 2013/0320691 | A1 * | 12/2013 | Oshita ...................... | B60N 3/00 296/37.1 |

(Continued)

FOREIGN PATENT DOCUMENTS

JP 4-37089 U 3/1992

*Primary Examiner* — Gregory Blankenship
(74) *Attorney, Agent, or Firm* — Squire Patton Boggs (US) LLP

(57) ABSTRACT

In a motorcycle including a screen, a meter panel is arranged at the vehicle front of a rider, and a visor is arranged at the vehicle front of the meter panel. The visor is higher than the meter panel to form an air intake for taking in traveling wind between the visor and the meter panel. A duct extends to a rear side of the screen from the air intake at the vehicle rear of the visor, so that the duct can introduce traveling wind to the rear side of the screen.

12 Claims, 28 Drawing Sheets

(56) References Cited

U.S. PATENT DOCUMENTS

| | | | | |
|---|---|---|---|---|
| 2014/0159426 A1* | 6/2014 | Takahashi | B62J 17/04 | 296/192 |
| 2014/0203594 A1* | 7/2014 | Tsukui | B62J 17/04 | 296/192 |
| 2014/0225398 A1* | 8/2014 | Mikura | B62J 6/02 | 296/192 |
| 2015/0266532 A1* | 9/2015 | Horiuchi | B62J 23/00 | 296/78.1 |
| 2015/0274234 A1* | 10/2015 | Hara | B62J 17/04 | 296/78.1 |

* cited by examiner

Fig.20
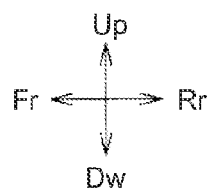
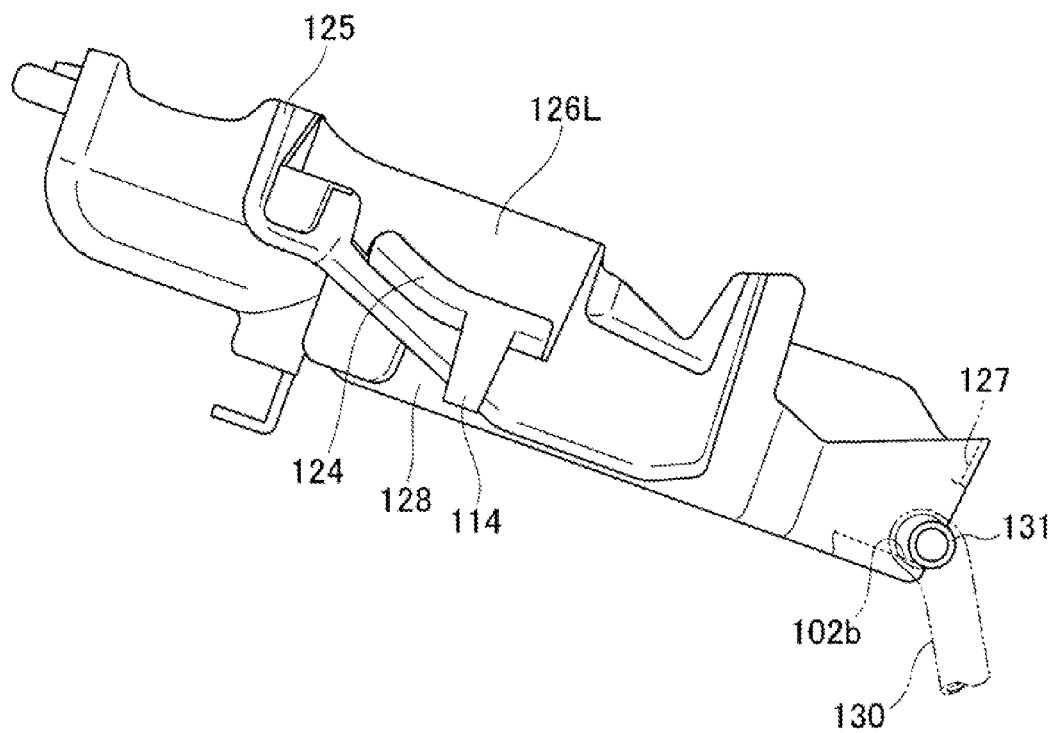

FRONT STRUCTURE OF MOTORCYCLE

BACKGROUND

1. Field

The present invention relates to improvement in a front structure of a motorcycle including a screen.

2. Description of the Related Art

There is known a front structure of a motorcycle including a screen for shielding traveling wind (see FIGS. 3, 4, 5 of Japanese Utility Model Registration Application Publication No. Hei 4-37089, hereinafter Patent Document 1.

As shown in FIGS. 3 and 5 of Patent Document 1, an upper cowl "11" (the quoted number indicates a reference numeral used in Patent Document 1. The same shall apply hereinafter.) is provided in a front portion of the vehicle, an air intake opening "15" is formed in the upper cowl "11," and an outer screen "20" is fixed to an attachment portion "19" of the upper cowl "11" above the opening "15." An inner screen "21" is supported in a vertically slidable manner to the outer screen "20" at the vehicle rear of the outer screen "20." The outer screen "20" and the inner screen "21" constitute a wind screen "22."

As shown in FIG. 4 of Patent Document 1, an air cylinder "23" is attached to the inner screen "21" and moves the inner screen "21." When a part of traveling wind flows in from the opening "15," the traveling wind passes through between the outer screen "20" and the inner screen "21," and flows as indicated by arrow B.

In the technique of Patent Document 1, the flow path of traveling wind changes when the screen is slid vertically. Hence, the amount of traveling wind fed to the rear side of the screen may vary, and there is room for improvement.

There is a need for a technique that can suppress variation in steerability of the vehicle, in a motorcycle including a screen whose height is vertically adjustable.

SUMMARY

An objective of the present invention is to provide a technique that can suppress variation in steerability of the vehicle, in a motorcycle including a screen whose height is vertically adjustable.

In one embodiment, a front structure of a motorcycle includes a handle supported by a head pipe and steered by a rider, and a screen arranged at a vehicle front of the handle and shielding traveling wind directed to the rider. A meter panel is arranged at the vehicle front of the rider, and a visor is arranged at the vehicle front of the meter panel and shielding solar radiation directed to meter equipment. The visor is arranged higher than the meter panel to thereby form an air intake for taking in traveling wind between the visor and the meter panel. A duct extends to a rear face of the screen from the air intake is provided at the vehicle rear of the visor, so that the duct can introduce traveling wind to the rear face of the screen.

In another embodiment, the length of the duct overlaps a movable range in which the lower end of the screen slides, and is longer than the movable range.

In another embodiment, the meter panel is provided lower than the screen, and a rail allowing the screen to slide vertically is arranged on the head pipe side. The rail is arranged so as to incline along a front face of the meter panel, and the visor covers the vehicle front of the screen.

In another embodiment, the visor overlaps the duct and the rail in front view of the vehicle, and is a member less transmissive than the screen.

In another embodiment, the rail is provided in a left and right pair, and the duct is arranged between the paired left and right rails.

In another embodiment, the duct includes a curved portion curved so as to come closer to the visor as it approaches the air intake.

In another embodiment, a lower edge of the screen has a center portion in the vehicle width direction extending further in the front lower direction than both end portions thereof, and is formed so as to follow the shapes of mirror covers, which are provided on sides of the meter panel and cover support portions of the left and right mirrors.

In another embodiment, in side view, the rail is curved in such a manner as to protrude downward, and the screen is curved in such a manner as to protrude upward.

According to some embodiments, a duct extending to the rear face of the screen from the air intake is provided at the vehicle rear of the visor. A part of traveling wind introduced from the air intake passes through the duct and is guided to the rear side of the screen, while a part of traveling wind introduced from the air intake flows to the front of the screen. Since the duct allows traveling wind to flow to the rear of the screen, the amount of traveling wind passing through between the visor and the screen can be reduced.

The amount of traveling wind passing through between the visor and the screen is reduced, and traveling wind taken in from the air intake passes through the duct and is guided to the rear side of the screen. Hence, the amount of traveling wind being guided to the rear of the screen does not vary largely even when the screen is slid upward or downward, and thus traveling wind can be constantly guided to the rear of the screen.

In another embodiment, the length of the duct overlaps a movable range in which the lower end of the screen slides, and is longer than the movable range. When the lower end position of the screen is at the uppermost sliding position of the screen, the lower end of the duct is lower than the lower end of the screen. Similarly, when the lower end position of the screen is at the lowermost sliding position of the screen, the lower end of the duct is also lower than the lower end of the screen.

To be specific, since the lower end of the duct is positioned lower than the lower end of the screen, traveling wind taken in from the air intake enters the duct and is guided to the rear of the screen regardless of the position of the screen, and thus its amount is less likely to vary. In other words, the amount of traveling wind flowing to the rear of the screen does not vary largely even when the screen is slid to a different position, and thus traveling wind can be constantly guided to the rear of the screen. As a result, ease in steering can be enhanced while maintaining a predetermined windbreak performance.

In another embodiment, the rail supporting the screen in a vertically slidable manner is arranged so as to incline along the meter panel. That is, since the rail is arranged according to the curvature of the meter panel, the screen shape can be designed more freely than a case where the rail is not arranged according to the curvature of the meter panel.

Additionally, the gap between the screen and the visor, as well as between the screen and the upper end of the duct can be made as small as possible. Accordingly, variation in the amount of traveling wind flowing through between the screen and the visor, as well as variation in the amount of traveling wind flowing through between the screen and the upper end of the duct can be suppressed, even when the screen is slid upward or downward. Hence, the amount of traveling wind flowing to the rear of the screen can be kept constant.

It is possible to suppress variation in the amount of traveling wind flowing through between the screen and the visor, as well as between the screen and the upper end of the duct, if the gaps are reduced. Since the gaps are small, variation in the amount of traveling wind flowing to the rear side of the screen is small, even when the screen is slid vertically. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance.

In another embodiment, the visor overlapping the duct and the rail is formed of a member less transmissive than the screen. The visor using the low-transmittance member can cover up the duct and the rail, so that appearance of the vehicle can be improved.

In another embodiment, the duct is arranged between the paired left and right rails. Thus, the visor can be arranged closer to the rails.

Conventionally, in a screen slide mechanism using an air cylinder, for example, the size of the slide mechanism tended to become large, and the slide stroke of the screen was limited.

Meanwhile, the present invention does not use an air cylinder but uses the left and right rails, and thus the screen mechanism can be reduced in size. Additionally, since the duct is arranged between the paired left and right rails, limited space can be utilized efficiently. Reduction in the size of the screen mechanism and effective utilization of space allows more freedom in designing the front portion of the vehicle, whereby appearance of the vehicle can be improved more easily.

In another embodiment, the duct includes the curved portion that comes closer to the visor as it approaches the air intake. Since the duct comes close to the visor around the air intake, the gap between the duct and the visor can be reduced. Reduction in the gap allows a larger amount of traveling wind to be taken into the duct from the air intake. It is possible to suppress variation in the amount of traveling wind flowing through between the screen and the visor, as well as between the upper end of the duct and the screen, even when the screen is vertically slid to a different position. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance.

In another embodiment, the lower edge of the screen is formed so as to follow the shape of the mirror covers. Since the lower edge of the screen is formed so as to follow the shape of the mirror covers, the lower edge of the screen can be brought closer to the mirror covers when the screen is moved downward. Additionally, the movable range in which the screen slides can be made larger than a case where the lower edge of the screen is formed so as not to follow the shape of the mirror cover. As a result, the windbreak performance of the screen can be enhanced.

In another embodiment, in side view, the rail is curved in such a manner as to protrude downward, and the screen is curved in such a manner as to protrude upward. By thus assigning predetermined curvatures to the rail and the screen, an upper end of the visor and the screen forming a gap can be constantly kept as close as possible, even when the screen is slid. A part of traveling wind having entered from the air intake flows through between the visor and the screen without entering the duct. At this time, since the gap between the upper end of the visor and the screen is small, and variation in the gap caused by sliding of the screen is kept small, the flow amount of traveling wind can be suppressed. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance.

BRIEF DESCRIPTION OF THE DRAWINGS

FIG. 20 is a left side view of the vehicle showing the fuel tray.

DETAILED DESCRIPTION

Figure 1:
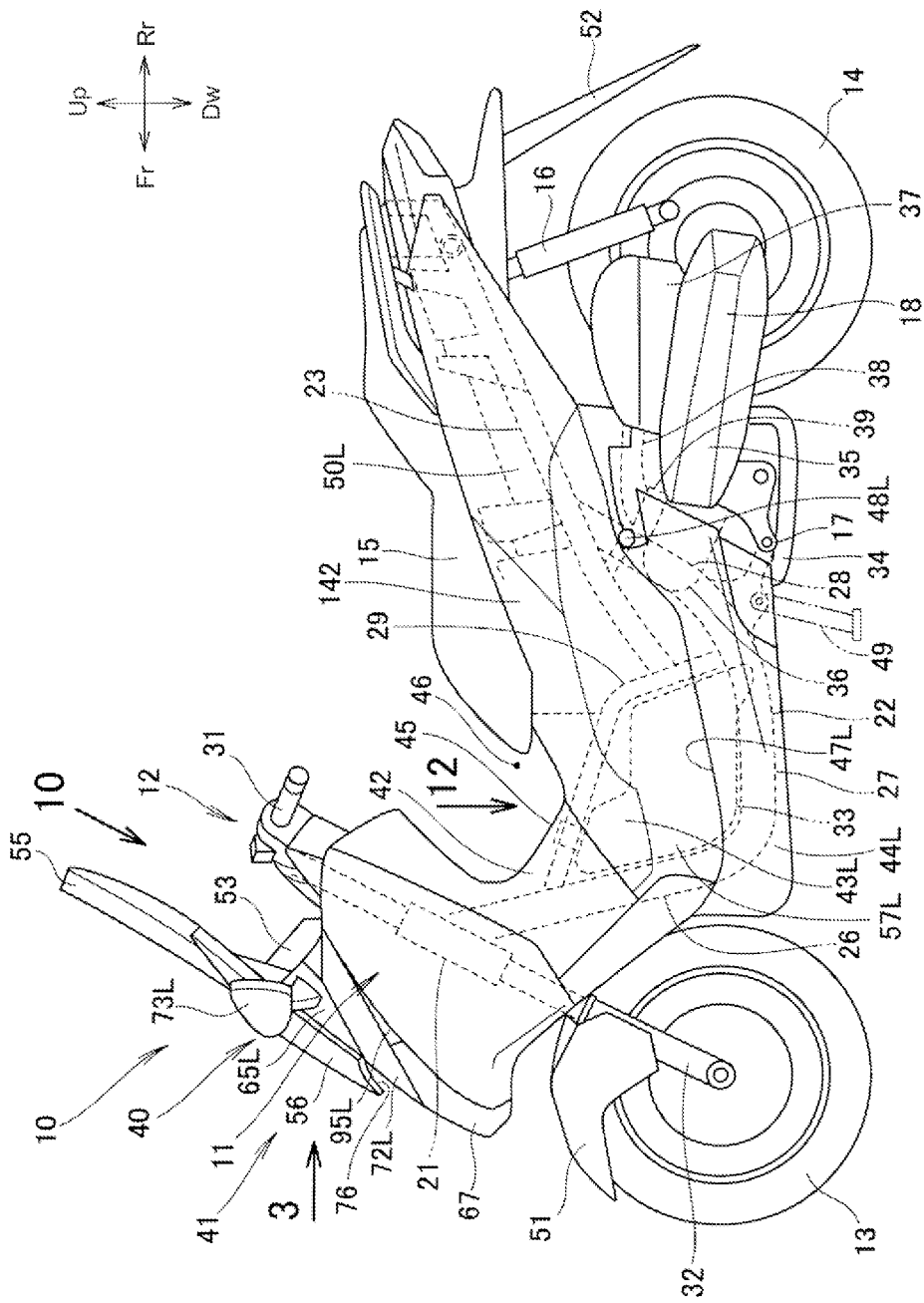
FIG. 1 is a left side view of a motorcycle according to the present invention.

Hereinafter, an embodiment of the present invention will be described in detail. In the drawings and the example, directions such as "upper," "lower," "front," "rear," "left," and "right" are those seen from a rider of a motorcycle.

Examples of the present invention will be described with reference to the drawings.

As shown in FIG. 1, a motorcycle 10 is a straddle type vehicle that includes a body frame 11, a front wheel steering portion 12 steerably supported by a front portion of the body frame 11 and including a front wheel 13, and a seat 15 supported by the body frame 11 and on which a rider sits. A pivot shaft 17 is provided in the body frame 11 in a position below the seat 15, and a power unit 18 extends toward the vehicle rear from the pivot shaft 17, and serves as a power source as well as a swing arm. A rear wheel 14 is attached to a rear end portion of the power unit 18, and a cushion unit 16 is bridged across the rear end of the power unit 18 and the body frame 11. The motorcycle is ridden by the rider straddling a front portion of the seat 15 and ridden by a passenger straddling a rear portion of the seat 15.

The body frame 11 has a head pipe 21, a main frame portion 22 extending toward the vehicle rear from the head pipe 21, and rear frames 23 connected to and supported by the rear end of the main frame portion 22, and extending obliquely upward in the rear direction of the vehicle. The main frame portion 22 includes an obliquely downwardly-extending portion 26 extending obliquely downward in the rear direction of the vehicle, a horizontal portion extending horizontally toward the vehicle rear from the obliquely downwardly-extending portion 26, and an obliquely upwardly-extending portion 28 extending obliquely upward in the rear direction of the vehicle from the rear end of the horizontal portion 27. An upper frame 29 that extends toward the vehicle rear from the obliquely downwardly-extending portion 26 and then extends obliquely downward in the rear direction of the vehicle is bridged across the obliquely downwardly-extending portion 26 and the horizontal portion 27. The rear frames 23 that support the seat 15 extend obliquely upward in the rear direction from rear portions of the upper frame 29.

Main elements of the front wheel steering portion 12 are a handle 31 rotatably supported by the head pipe 21 and steered by the rider, a front fork 32 provided integrally with the handle 31 and extending obliquely downward in the front direction of the vehicle, and the front wheel 13 attached to the lower end of the front fork 32.

A fuel tank 33 is arranged so as to be surrounded by the main frame portion 22 and the upper frame 29 in the front lower direction of the seat 15 on which the rider sits. Main elements of the power unit 18, which is arranged behind the fuel tank 33, are a unit case portion 35, a cylinder portion 36 extending toward the vehicle front from the unit case portion 35, an air cleaner unit 37 attached to an upper face of the unit case portion 35, a connecting tube 38 extending from the air cleaner unit 37, and a throttle body 39 jointed to the tip of the connecting tube 38. The throttle body 39 is connected to the cylinder portion 36. In FIG. 1, reference numeral 34 indicates an exhaust pipe 34 extending from the cylinder portion 36.

Main elements of a body cover 40 are a front cover portion 41 covering the periphery of the front wheel steering portion 12, an inner panel 42 covering a rear face of the front cover portion 41, left and right side body covers 43L, 43R (only reference numeral 43L on the near side in FIG. 1 is shown) extending toward the vehicle rear so as to be continuous with the inner panel 42 to cover sides of the vehicle body, left and right lower side body covers 57L, 57R (only reference numeral 57L on the near side in FIG. 1 is shown) provided below the left and right side body covers 43L, 43R, left and right under covers 44L, 44R (only reference numeral 44L on the near side in FIG. 1 is shown) provided below the left and right lower side body covers 57L, 57R, and left and right rear side body covers 50L, 50R (only reference numeral 50L on the near side in FIG. 1 is shown) provided so as to be continuous with rear portions of the left and right side body covers 43L, 43R.

A center cover 45 is bridged across the left and right side body covers 43L, 43R. A straddle space 46, which is formed into a substantial U shape opened upward in side view of the vehicle and can be straddled by moving a rider's leg thereover when mounting and dismounting, is formed by the inner panel 42, the left and right side body covers 43L, 43R, and the center cover 45, between the seat 15 and the handle 31.

Foot rest portions 47L, 47R (only reference numeral 47L on the near side in FIG. 1 is shown) on which the rider places his/her feet are formed in the under covers 44L, 44R. Pillion steps 48L, 48R (only reference numeral 48L on the near side in FIG. 1 is shown) on which a passenger places his/her feet are provided in the body frame 11 in upper positions behind the foot rest portions 47L, 47R. A side stand 49 is attached to the main frame portion 22. The fuel tank 33 is provided so as to be surrounded by the main frame portion 22 and the upper frame 29 below the center cover 45.

A front fender 51 covering an upper part of the front wheel 13 to shield mud splashed from the front wheel 13 is attached to the front fork 32, and a rear fender 52 covering upper and diagonally upper rear parts of the rear wheel 14 to shield mud splashed from the rear wheel 14 is attached to the rear frames 23.

A meter unit 53 is arranged above the front cover portion 41, in front of the handle 31, and in front of the seat 15 on which the rider sits, while a screen 55 for shielding traveling wind directed to the rider is arranged in front of the meter unit 53. A front portion of the meter unit 53 is covered with a meter panel (see FIG. 2), and a visor 56 for shielding solar radiation directed to meter equipment including the meter unit 53, is arranged at the vehicle front of the meter panel 54 and the vehicle front of the screen 55.

Next, a supporting structure and the like of the screen and meter panel will be described.

Figure 2:
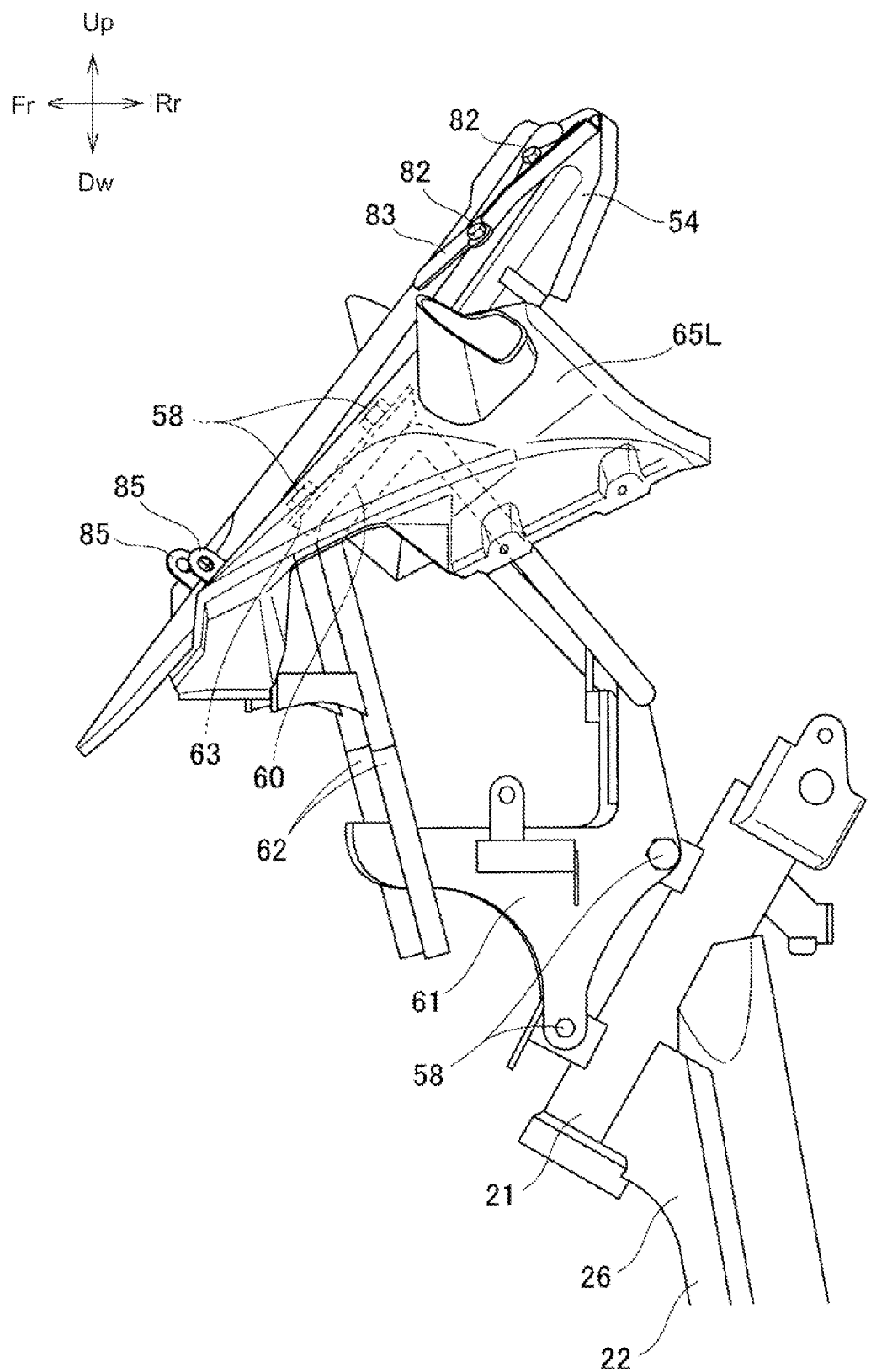
FIG. 2 is a left side view for describing the structure of a screen-supporting portion.

As shown in FIG. 2, a first stay 61 formed by processing a plate member extends toward the vehicle front through fastening screws 58 from the front end of the head pipe 21, a pipe-shaped second stay 62 is joined to the first stay 61 and extends in the front upper direction of the vehicle, a third stay 60 formed by processing a plate member and joined to the second stay 62 extends, and a rail stay 63 is attached to the third stay 60 through the fastening screws 58. The rail stay 63 is provided integrally with later-mentioned rails 64L, 64R (see FIG. 3) in the third stay 60. Left and right mirror covers 65L, 65R (only reference numeral 65L on the near side in FIG. 1 is shown) and the meter panel 54, which is a constituent element of a front portion of the meter unit 53 (see FIG. 1) as meter equipment, are fastened to the second stay 62.

Next, a front structure of the vehicle as seen from the vehicle front will be described.

Figure 3:
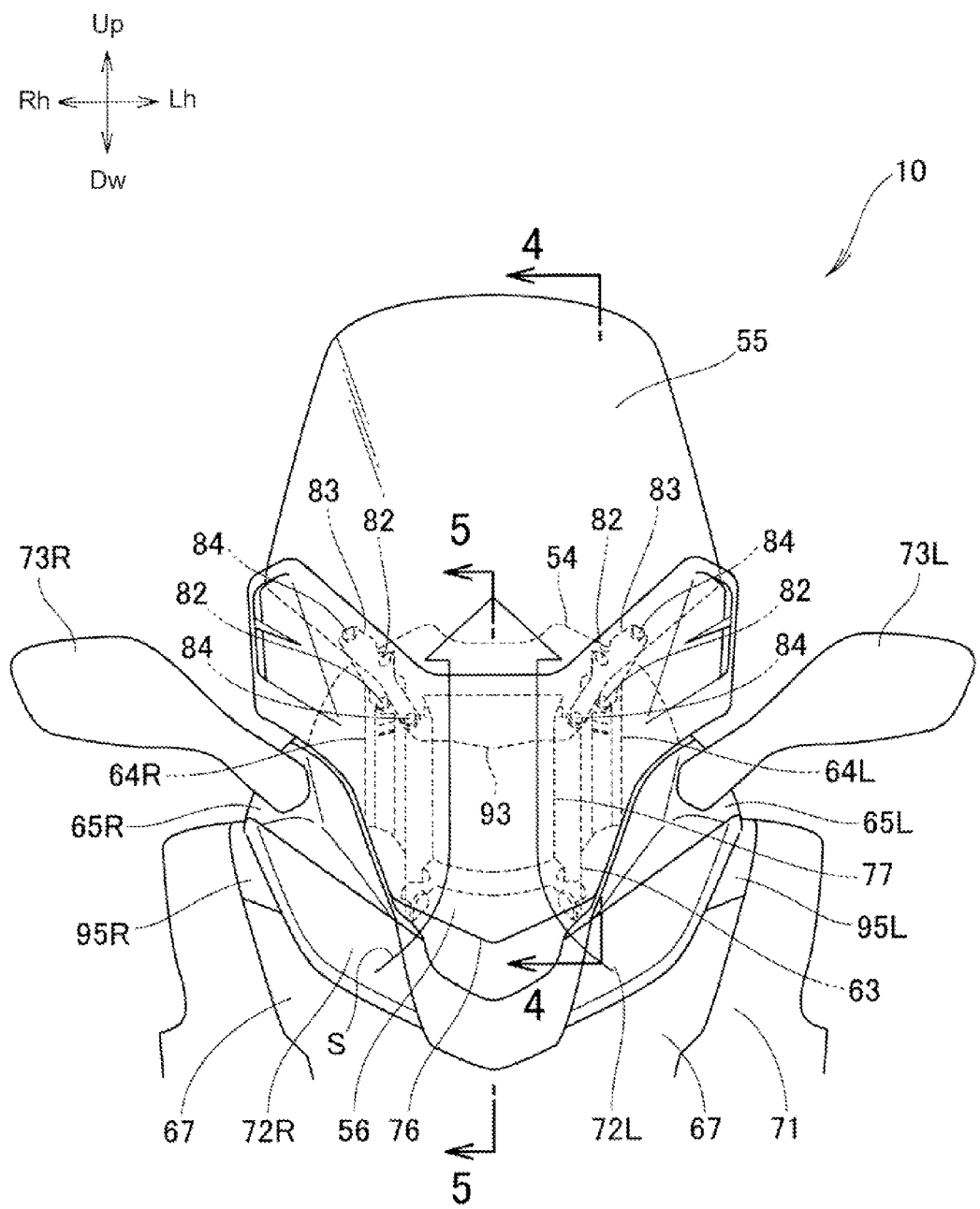
FIG. 3 is a view on arrow 3 of FIG. 1.

As shown in FIG. 3, a headlight 67 is arranged at the front end of the vehicle, a part below the headlight 67 is covered with a front cover 71, parts above the headlight 67 are covered with garnishes 72L, 72R, the left and right mirror covers 65L, 65R, which cover support portions of mirrors 73L, 73R for checking the rear, are provided in the upper left and right of the garnishes 72L, 72R in the vehicle width direction so as to be continuous with the garnishes 72L, 72R, and the left and right mirrors 73L, 73R are arranged above the left and right mirror covers 65L, 65R so as to be continuous therewith.

The visor 56 for shielding solar radiation directed to meter equipment is disposed between the left and right mirror covers 65L, 65R, while extending upward in such a manner as to be continuous with the left and right mirror covers 65L, 65R.

The screen 55 for shielding traveling wind directed to the rider extends upward in such a manner as to overlap the vehicle rear side of the visor 56. The screen 55 is slidably supported by the paired left and right rails 64L, 64R.

An air intake 76 for taking in traveling wind is formed between the left and right mirror covers 65L, 65R, and between the meter panel 54 and the screen 55 arranged in front of the meter panel 54. A duct 77 for introducing traveling wind to a rear face 55b of the screen 55 is arranged between the paired left and right rails 64L, 64R, which are arranged narrower than the air intake 76 and support the screen 55 in a vertically slidable manner. In FIG. 3, arrow S indicates traveling wind flowing through the duct 77.

The visor 56 overlaps the duct 77 and the rails 64L, 64R (also referred to as "rail 64" below) in front view of the vehicle, and is made of a member less transmissive than the screen 55.

Details of the screen and peripheral parts will be described with reference to the following FIGS. 4 and 5.

Figure 4:
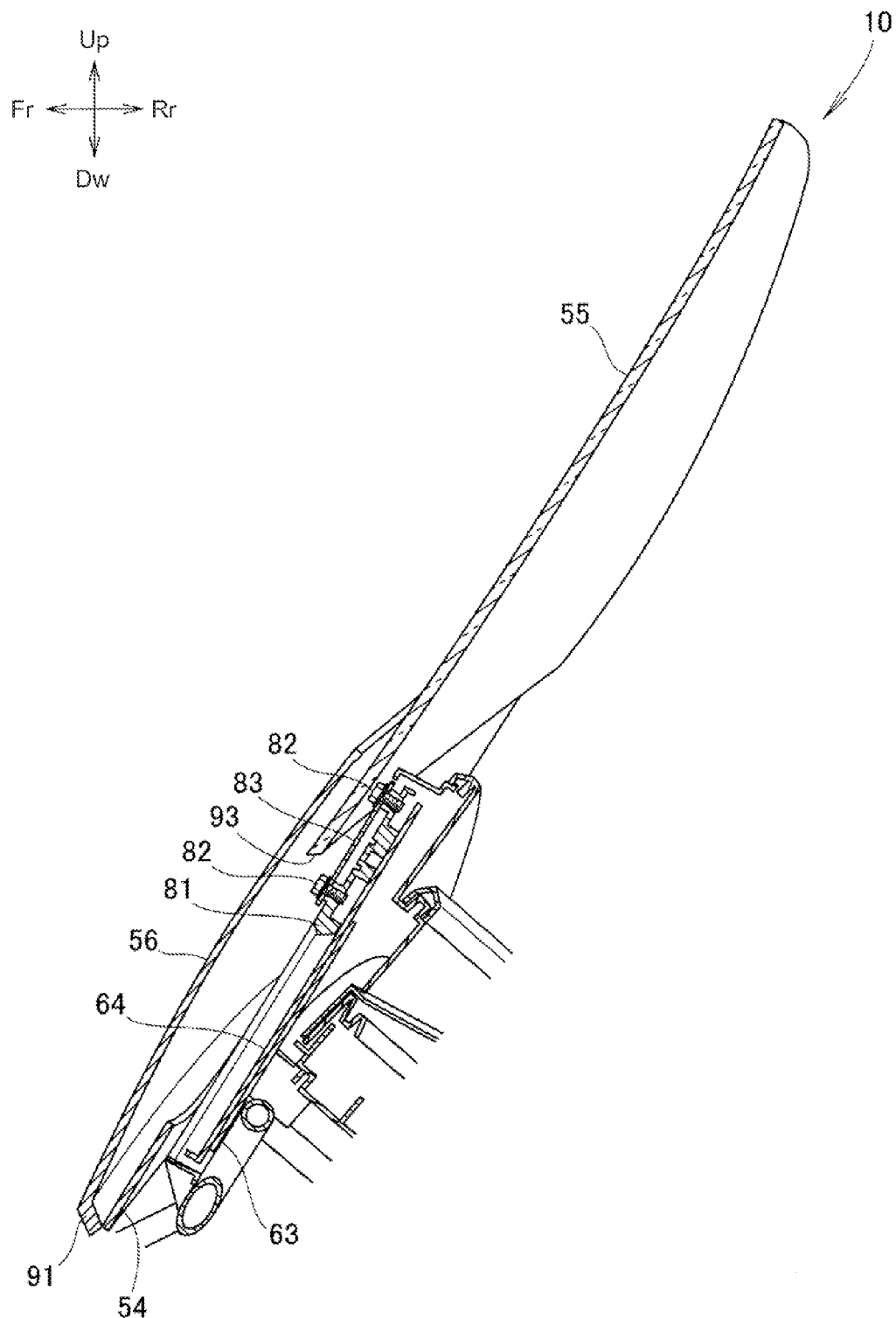
FIG. 4 is a cross-sectional view taken along line 4-4 of FIG. 3.

As shown in FIG. 4, the rail 64 is arranged integrally with the rail stay 63 close to the front of the meter panel 54, a slider 81 is arranged so as to be slidable along the rail 64, and a screen stay 83 is attached to the slider 81 through screws 82.

Referring back to FIG. 3, the screen stays 83, 83 are arranged in an inverted V-shape opened upward in front view of the vehicle, and each has the screen 55 attached thereto through screw members 84 at upper and lower ends. This configuration allows the screen 55 to slide vertically on the rails 64 provided on the head pipe 21 side.

Referring back to FIG. 4, the meter panel 54 is provided in a lower part of the screen 55, and rails 64 allowing the screen 55 to slide vertically are arranged close to the front of the meter panel 54. The rails 64 are arranged so as to incline from the lower front toward the upper rear along the meter panel 54, and the visor 56 covers the vehicle front of the screen 55.

Next, a positional relation and the like among the meter panel, the duct, the screen, and the visor will be described.

Figure 5:
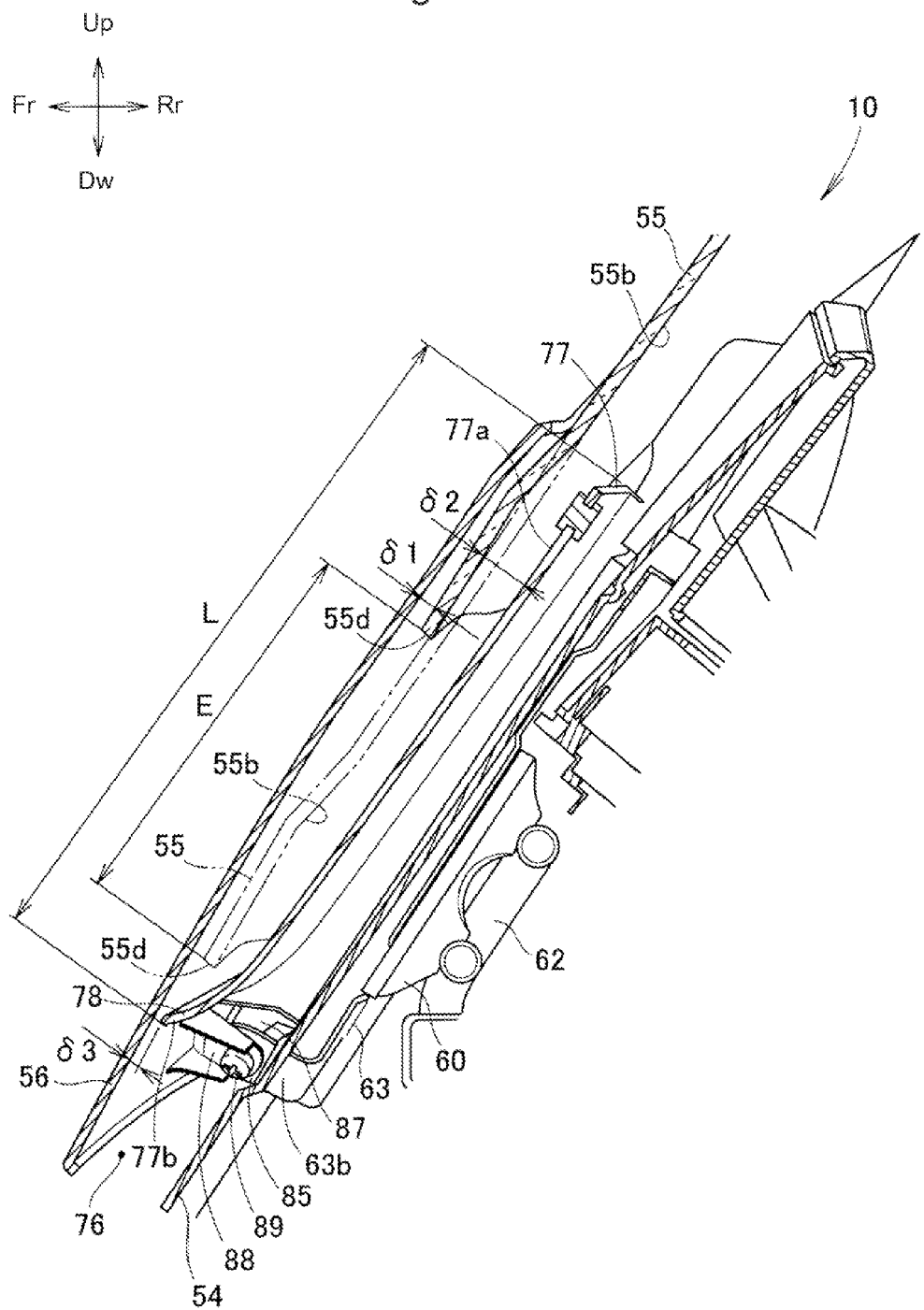
FIG. 5 is a cross-sectional view taken along line 5-5 of FIG. 3.

As shown in FIG. 5, a front portion of the motorcycle 10 includes the screen 55 provided at the vehicle front of the meter panel 54 to avoid traveling wind, and the visor 56 provided at the vehicle front of the screen 55 and covers the front portion of the vehicle.

The visor 56 is arranged higher than the meter panel 54 to thereby form the air intake 76 capable of taking in traveling wind between the visor 56 and the meter panel 54. The duct 77, which extends to the rear face 55b of the screen 55 from the air intake 76 and has a smaller flow path area than the opening area of the air intake 76, is provided at the vehicle rear of the visor 56, so that the duct 77 can introduce traveling wind to the rear face 55b of the screen 55. A curved portion 78 curved so as to come closer to the visor 56 as it approaches the air intake 76 is provided in a lower end 77b of the duct 77.

Next, an attachment structure of lower portions of the visor 56 and the duct 77 will be described.

A stay mounting eye 85 is fixed on a lower end 63b of the rail stay 63, a duct mounting eye 87 fixed on the duct 77 and having a female screw portion is brought into contact with the stay mounting eye 85 from outside in the vehicle width direction, while a visor mounting eye 88 formed in the visor 56 is brought into contact with the stay mounting eye from inside in the vehicle width direction. The duct 77 and the visor 56 are tightened together in such a manner as to sandwich the stay mounting eye 85, with a male screw 89 inserted from the inside to outside in the vehicle width direction. With this configuration, the number of parts can be reduced as compared to a case of providing mounting eyes separately.

Next, a description is given of a screen supporting structure and the like when the sliders are positioned at the upper end of the rails.

FIG. 6(a) is a front view showing the sliders 81 positioned at the upper end of the rails 64, FIG. 6(b) is a cross-sectional view taken along line (b)-(b) of FIG. 6(a), and FIG. 6(c) is a cross-sectional view taken along line (c)-(c) of FIG. 6(a). In FIG. 6(a), the screen 55, the visor 56, and the duct 77 are shown in an imaginary line.

As shown in FIG. 6(a), when the sliders 81, 81 are positioned at the upper end of the rails 64, the screen 55 moving integrally with the sliders 81, 81 is in an upper end position in the height direction. At this time, the sliders 81, 81 are fixed with unillustrated fixing means.

As shown in FIG. 6(b), when the right side of the vehicle is viewed from the center in the vehicle width direction, the air intake 76 is formed between the meter panel 54 and the visor 56, while the duct 77 is provided above the air intake 76 and the curved portion 78 curving so as to come closer to the visor 56 is provided in the duct 77. The screen 55 is arranged between the duct 77 and the visor 56. A gap $\delta 1$ is formed between the visor 56 and the screen 55, and a gap $\delta 2$ is formed between the screen 55 and the duct 77. At this time, since the screen 55 is arranged closer to the visor 56 side than to the duct 77 side, the magnitude correlation between the gaps is $\delta 1 < \delta 2$.

Traveling wind taken in from the air intake 76 enters the duct 77, and after exiting the duct 77, is introduced to the rear side 55b of the screen 55. Meanwhile, traveling wind that did not enter the duct 77 passes through between the duct 77 and the visor 56, and enters the gap $\delta 1$ formed between the visor 56 and the screen 55 or the gap $\delta 2$ formed between the screen 55 and the duct 77. At this time, since the gap $\delta 2$ is larger than the gap $\delta 1$, most of the traveling wind is introduced to the rear side 55b of the screen 55.

As shown in FIG. 6(c), at a position in the vicinity of the rails in the vehicle width direction, a bent portion 91 bent so as to abut on the surface of the meter panel 54 is formed on the lower end of the visor 56. Accordingly, traveling wind is hardly introduced to the rear side of the visor 56, in the vicinity of the rails.

Next, a description is given of the screen supporting structure and the like when the sliders are positioned at the lower end of the rails.

FIG. 7(a) is a front view showing the sliders 81 positioned at the lower end of the rails 64, FIG. 7(b) is a cross-sectional view taken along line (b)-(b) of FIG. 7(a), and FIG. 7(c) is a cross-sectional view taken along line (c)-(c) of FIG. 7(a). In FIG. 7(a), the screen 55, the visor 56, and the duct 77 are shown in an imaginary line.

As shown in FIG. 7(a), when the sliders 81, 81 are positioned at the lower end of the rails 64, the screen 55 moving integrally with the sliders 81, 81 is in a lower end position in the height direction. At this time, the sliders 81, 81 are fixed with unillustrated fixing means.

Figure 6:
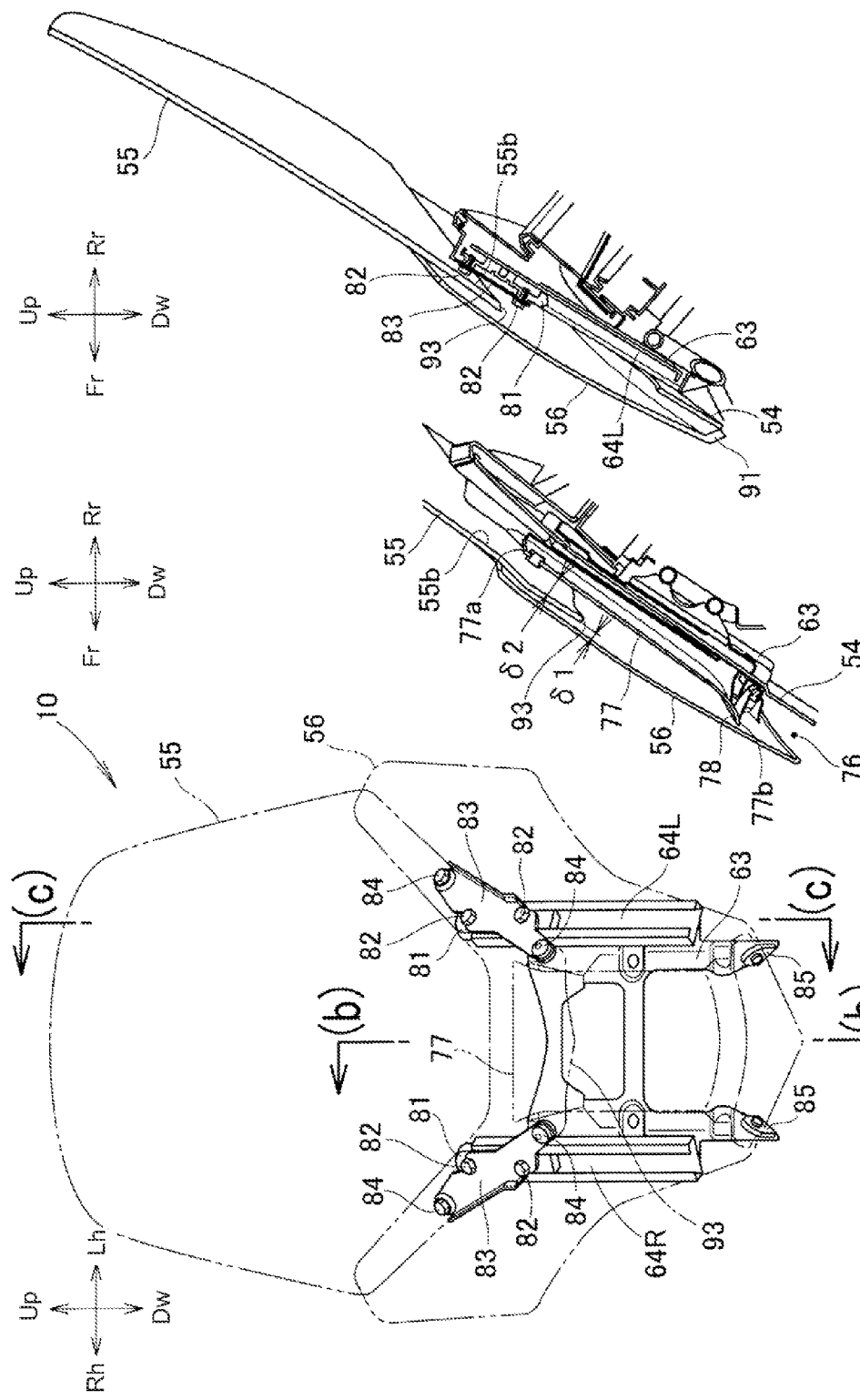
FIGS. 6 (a)-6 (c) are views for explaining an effect when a screen is in an uppermost sliding position.
Figure 7:
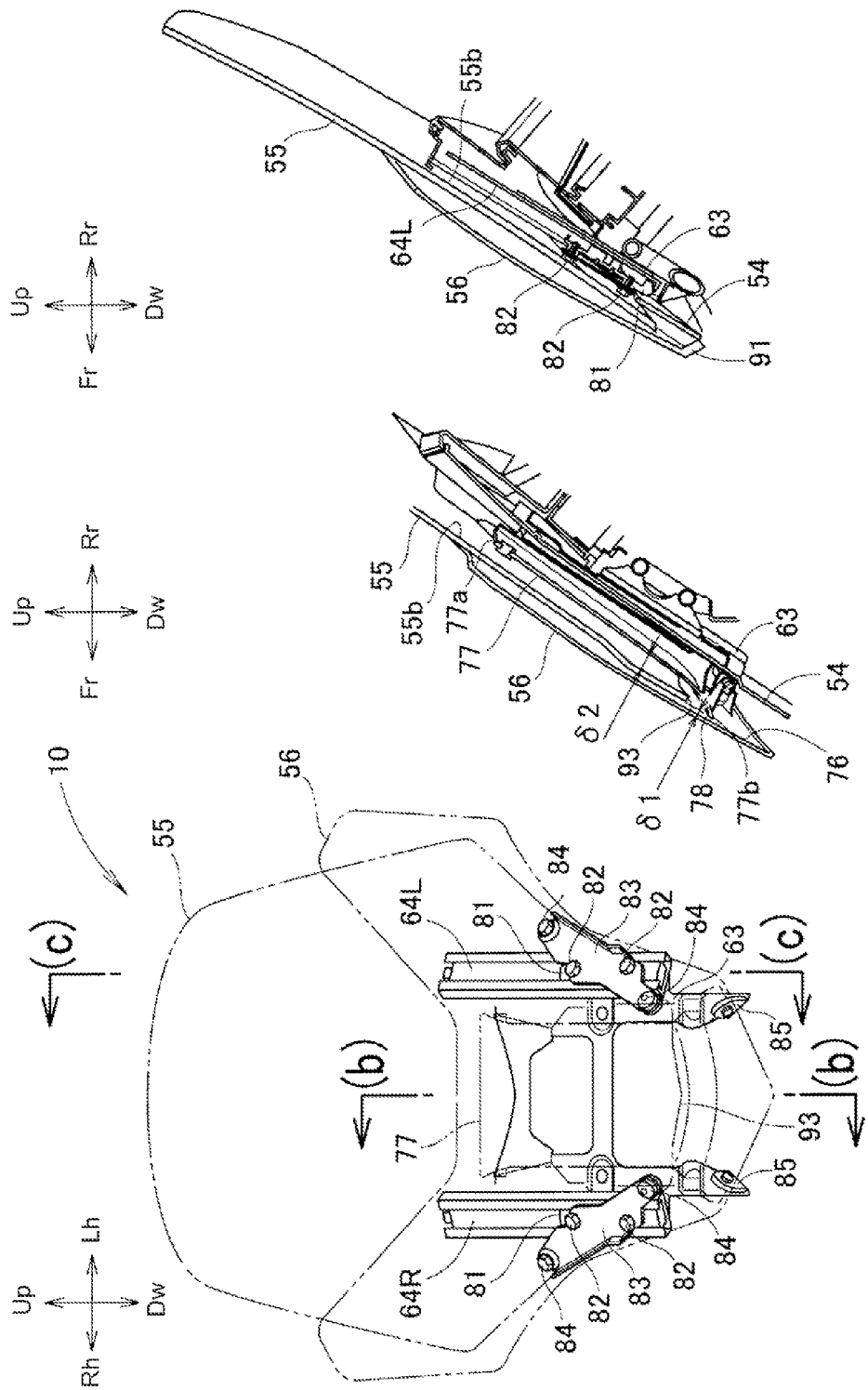
FIGS. 7 (a)-7 (c) are views for explaining an effect when the screen is in a lowermost sliding position.

As shown in FIG. 7(b), when the right side of the vehicle is viewed from the center in the vehicle width direction as in FIG. 6(b), the air intake 76 is formed between the meter panel 54 and the visor 56, while the duct 77 is provided above the air intake 76 and the curved portion 78 is provided in the duct 77. The screen 55 is arranged between the duct 77 and the visor 56. The gap $\delta 1$ is formed between the visor 56 and the screen 55, and the gap $\delta 2$ is formed between the screen 55 and the duct 77. At this time, since the screen 55 is arranged close to the visor 56 side, the magnitude correlation between the gaps is $\delta 1 < \delta 2$. Note that in FIGS. 6 and 7, the gaps $\delta 1$ and $\delta 2$ formed when the sliders 81 are positioned at the upper end of the rail 64 do not completely coincide with the gaps δ1 and δ2 formed when the sliders 81 are positioned at the lower end of the rail 64, but differ slightly.

Referring back to FIG. 5, a length L of the duct 77 overlaps a movable range E in which a lower end 55d of the screen 55 slides, and is longer than the movable range E.

Referring to FIG. 7(b), traveling wind taken in from the air intake 76 enters the duct 77, and after exiting the duct 77, is introduced to the rear side 55b of the screen 55 since the length of the duct 77 is longer than the sliding range of the screen 55. Meanwhile, traveling wind that did not enter the duct 77 passes through between the duct 77 and the visor 56, and enters the gap δ1 formed between the visor 56 and the screen 55 or the gap δ2 formed between the screen 55 and the duct 77. At this time, since the gap δ2 is larger than the gap δ1, most of the traveling wind is introduced to the rear side 55b of the screen 55.

As shown in FIG. 7(c), as in FIG. 6(c), at a position in the vicinity of the rails in the vehicle width direction, the bent portion 91 bent toward the surface of the meter panel 54 is formed on the lower end of the visor 56. Accordingly, traveling wind is hardly introduced to the rear side of the visor 56, in the vicinity of the rails.

Figure 8:
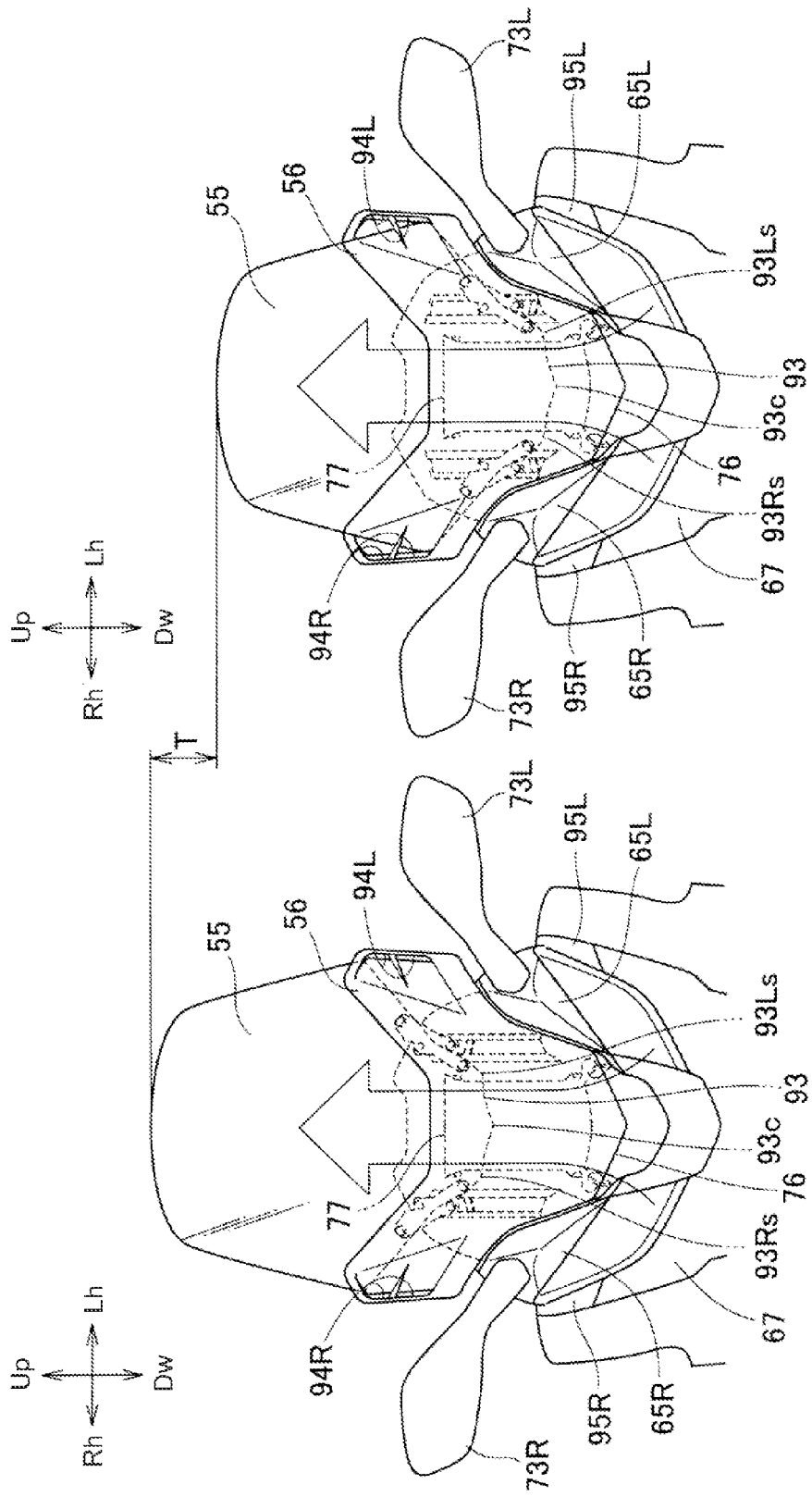
FIGS. 8(a) and 8(b) are views for explaining an effect that the screen height is adjustable.

FIG. 8(a) is a front view of an upper portion of the vehicle when the screen is in the upper end position, and FIG. 8 (b) is a front view of the upper portion of the vehicle when the screen is in the lower end position.

Referring to both of FIGS. 8(a) and 8(b), the screen 55 can be moved for a length T in the height direction. A lower edge 93 of the screen 55 has a center portion 93c in the vehicle width direction that extends further in the front lower direction than its both end portions 93Ls, 93Rs. In addition, the lower edge 93 of the screen 55 is formed so as to follow the shapes of the mirror covers 65L, 65R, which are provided on sides of the meter panel 54 and cover the support portions of the left and right mirrors 73L, 73R.

Next, visor openings and the like provided in upper side portions of the visor in the vehicle width direction will be described.

Figure 9:
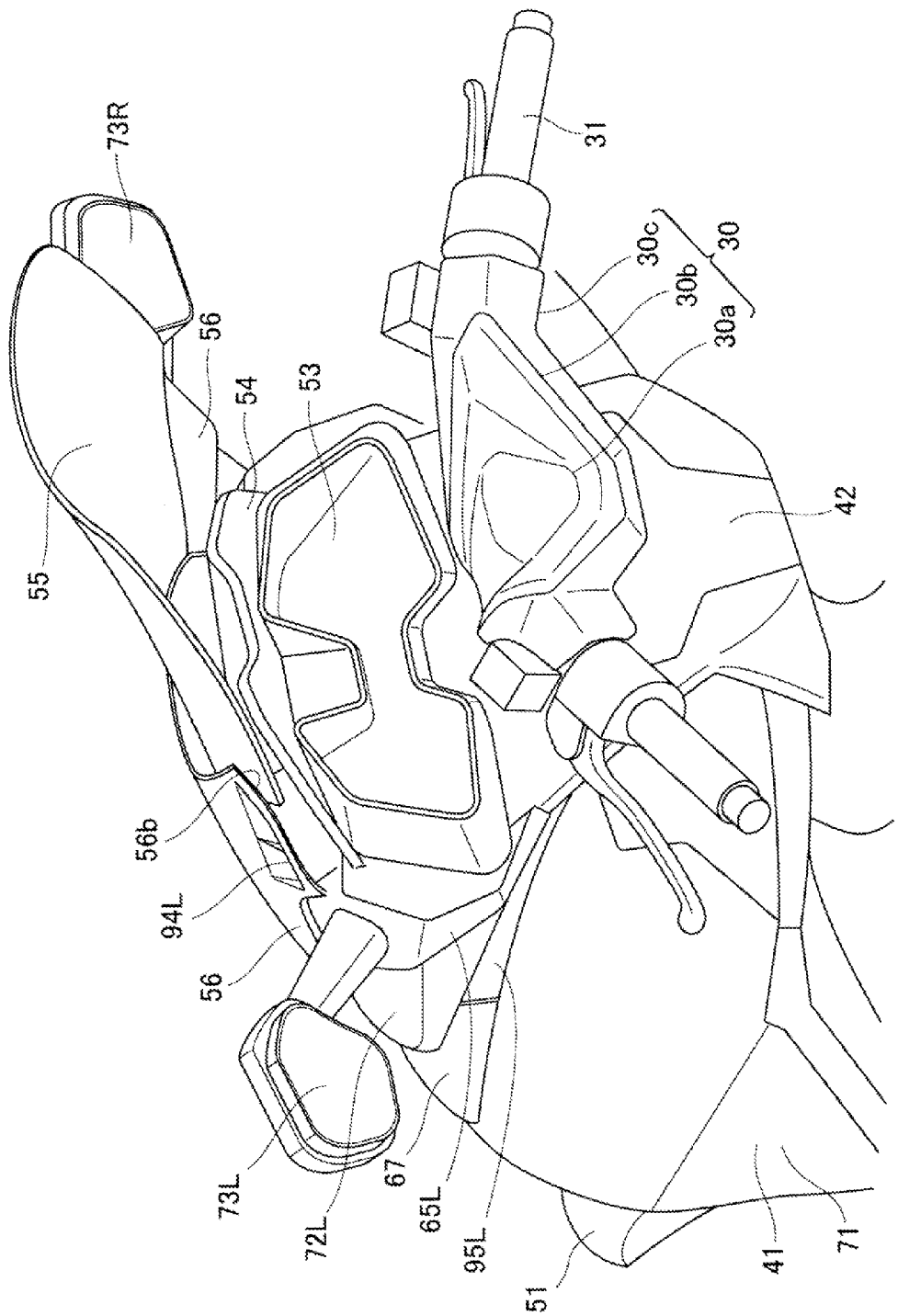
FIG. 9 is a perspective view of a front portion of the vehicle describing visor openings.

As shown in FIGS. 8(a), 8(b) and 9, left and right visor openings 94L, 94R for introducing traveling wind to the rear side 56b of the visor 56 are provided in upper side portions of the visor 56 in the vehicle width direction. The left and right visor openings 94L, 94R are arranged behind the left and right mirrors 73L, 73R, respectively. Since these left and right visor openings 94L, 94R enable appropriate amount of traveling wind to be fed on the arm portions of the rider, clothing on the arms of the rider is less likely to flap while traveling.

Additionally, left and right sub covers 95L, 95R, which have similar appearances as the headlight 67, are provided so as to be continuous with both ends of the headlight 67 in the vehicle width direction, and extend to the vehicle rear of the meter panel 54. The left and right sub covers 95L, 95R can make the headlight 67 appear larger, and the front portion of the vehicle can have characteristic and unique appearance.

Meanwhile, the handle 31 is covered with a handle cover 30 consisting of a combination of three cover pieces 30a, 30b, 30c.

Next, a positional relation and the like between the meter panel and the rails will be described.

Figure 10:
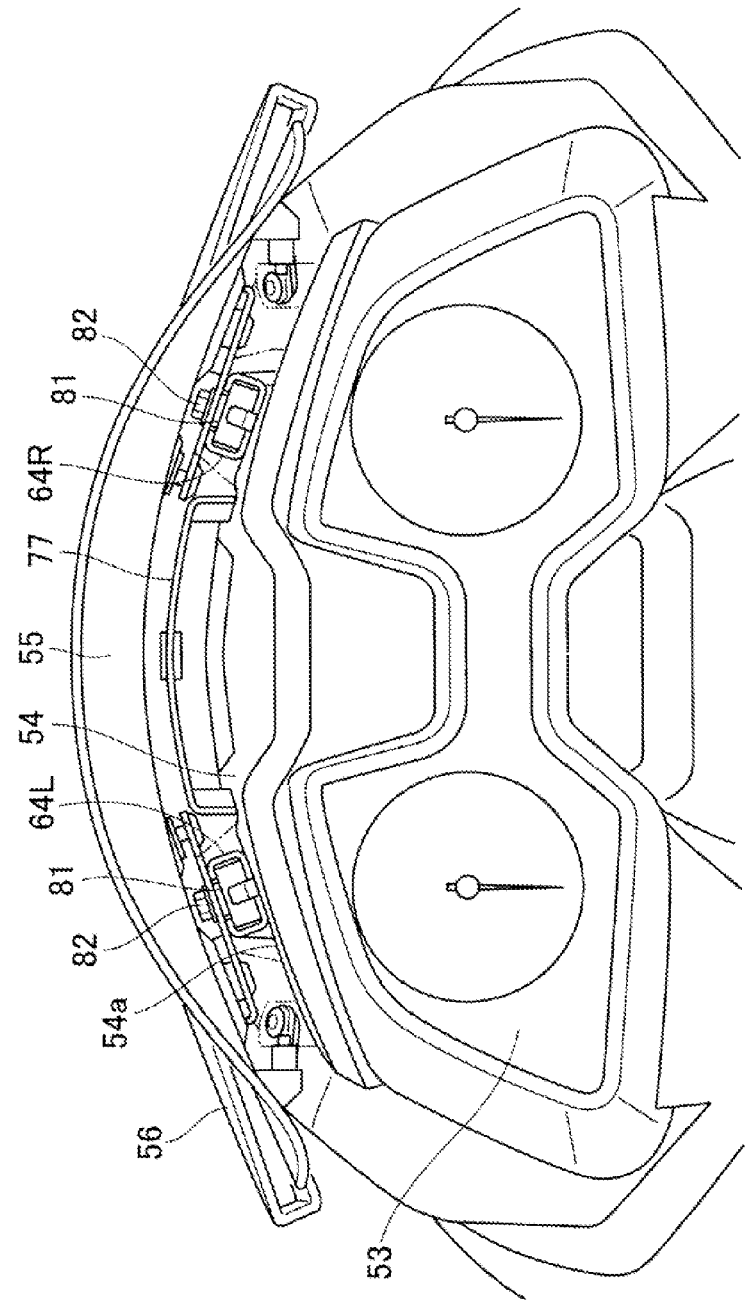
FIG. 10 is a view on arrow 10 of FIG. 1.

As shown in FIG. 10, when the screen 55 is viewed from above along the longitudinal axis direction of the head pipe 21 (see FIG. 1), the left and right rails 64L, 64R extend vertically in the sliding direction of the sliders 81 arranged along a front face 54a of the meter panel 54, which protrudes slightly toward the vehicle front. The visor 56 is provided so as to cover the front of the screen 55. In FIG. 10, parts of the meter panel 54 where it covers the left and right rails 64L, 64R from above are omitted, to clarify the arrangement of the left and right rails.

Next, a modified version of the above example will be described.

FIG. 11(a) explains a positional relation between the screen and the visor when the screen is positioned at the lower end, and FIG. 11(b) explains a positional relation between the screen and the visor when the screen is positioned at the upper end.

As shown in FIGS. 11(a) and 11(b), in order to keep a gap p between the screen 55 and the visor 56 constant, the rail 64 is curved at a predetermined curvature and protrudes downward, and the screen 55 is curved at a predetermined curvature and protrudes upward. With this configuration, the amount of wind flowing through between the screen 55 and the visor 56 hardly varies when the screen 55 is slid along the rails 64. Accordingly, variation in steerability of the vehicle can be suppressed even more.

A fuel lid and peripheral parts arranged in the straddling portion will be described with reference to the following FIGS. 12 to 19.

Figure 12:
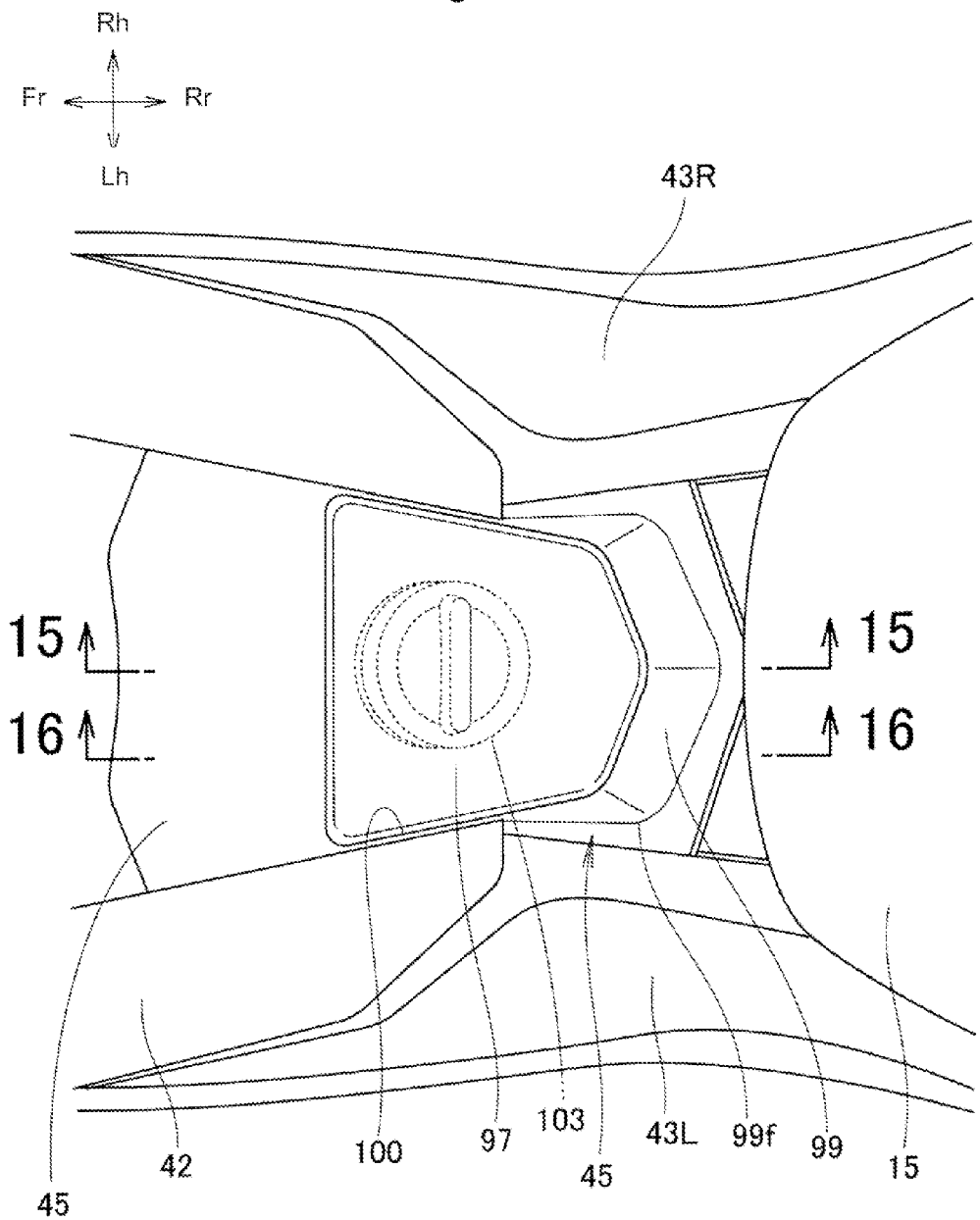
FIG. 12 is a view on arrow 12 of FIG. 1.

FIG. 12 is a plan view. As shown in FIG. 12, the straddle space 46, which is positioned in front of the seat 15 and over which the rider can move his/her leg when mounting and dismounting, is configured of: the inner panel 42, the left and right side body covers 43L, 43R provided so as to be continuous with the rear ends of the inner panel 42, the center cover 45 bridged across the left and right side body covers 43L, 43R, and a fuel lid 97 openably attached to the center cover 45 so as to be surrounded by the center cover 45.

Figure 13:
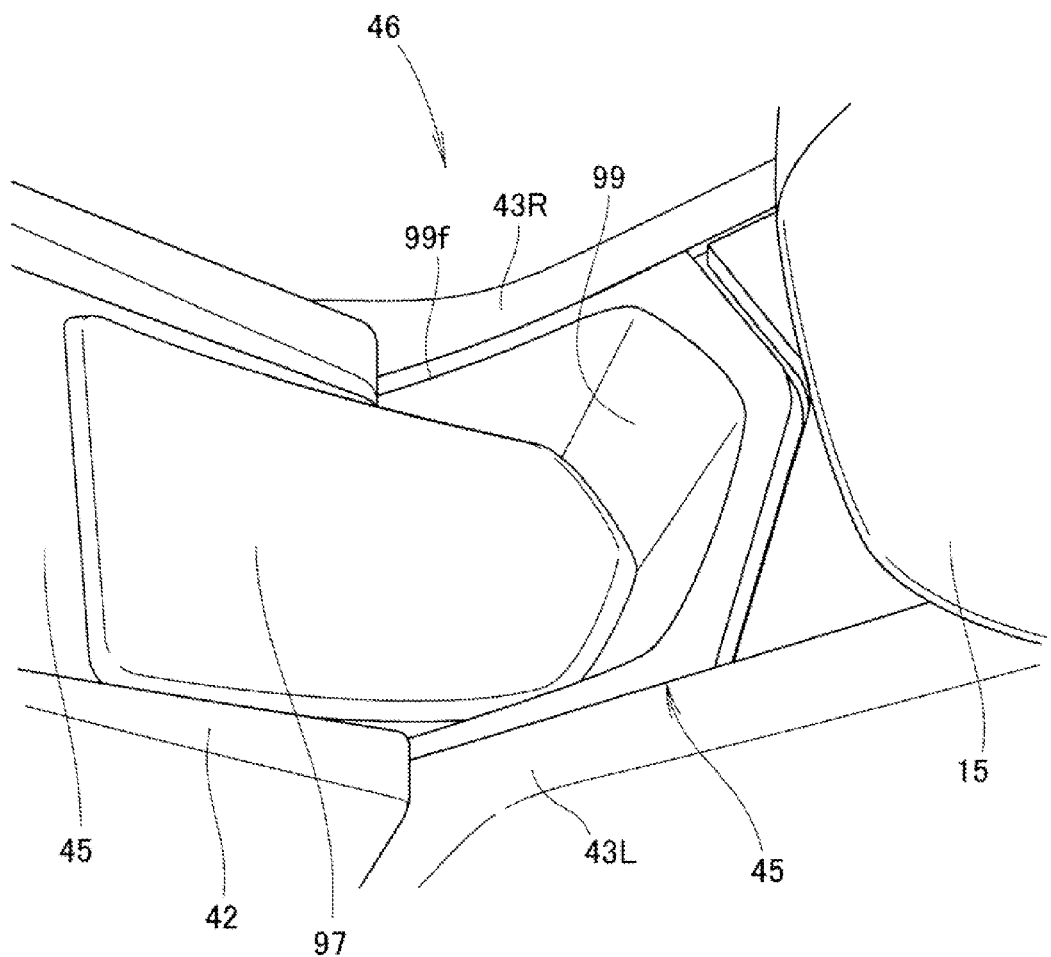
FIG. 13 is a perspective view of a fuel lid and peripheral parts.

As shown in FIG. 13, a concave portion 99 depressed downward is provided in a center portion of the center cover 45 in the vehicle width direction. The inner panel 42 extends downward toward the center cover 45, in such a manner as to be connected with an outer edge 99f of the concave portion 99. The fuel lid 97 is arranged such that it can be accommodated in the concave portion 99 in a closed state.

The fuel lid 97 is arranged such that it can be accommodated in the concave portion 99 in a closed state. Specifically, since the fuel lid 97 is provided in a position lower than the side body covers 43L, 43R or the inner panel 42, a structure can be achieved where the leg of the rider is less likely to hit the fuel lid 97 when he/she moves it over the straddle space 46. Hence, the fuel lid 97 can be protected.

Next, a fuel cap and peripheral parts that can be viewed when the fuel lid is detached will be described.

Figure 14:
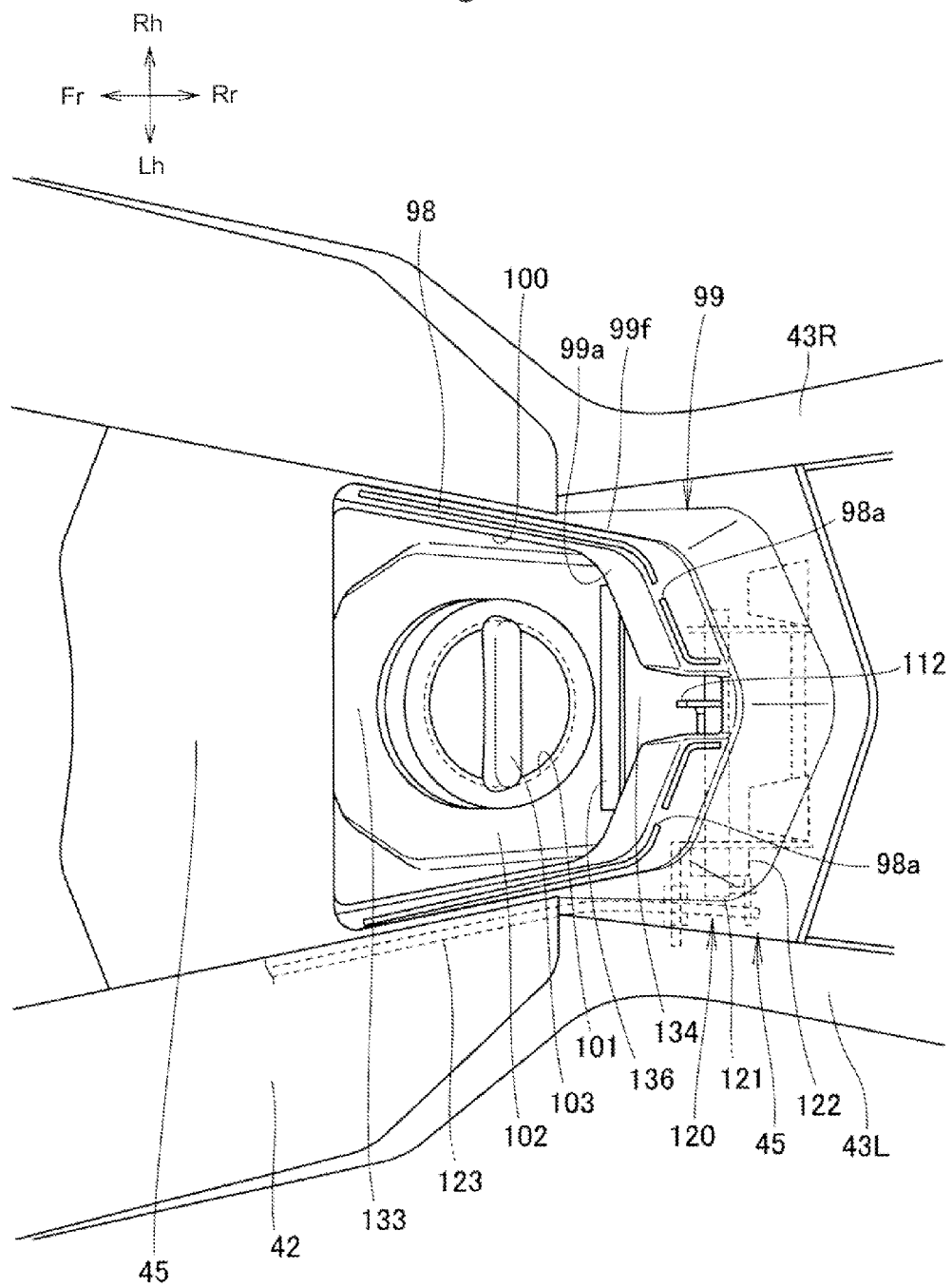
FIG. 14 is a view where the fuel lid and a seat are detached from the state in FIG. 12.

As shown in FIG. 14, an opening 100 to be covered with the fuel lid 97 (see FIG. 13) is provided in the center cover 45, a fuel filler port 101 is provided to the fuel tank 33 (see FIG. 1) below the fuel lid 97, and a fuel tray 102 is provided on the upper face of the fuel tank 33 in such a manner as to cover the periphery of the fuel filler port 101.

Figure 15:
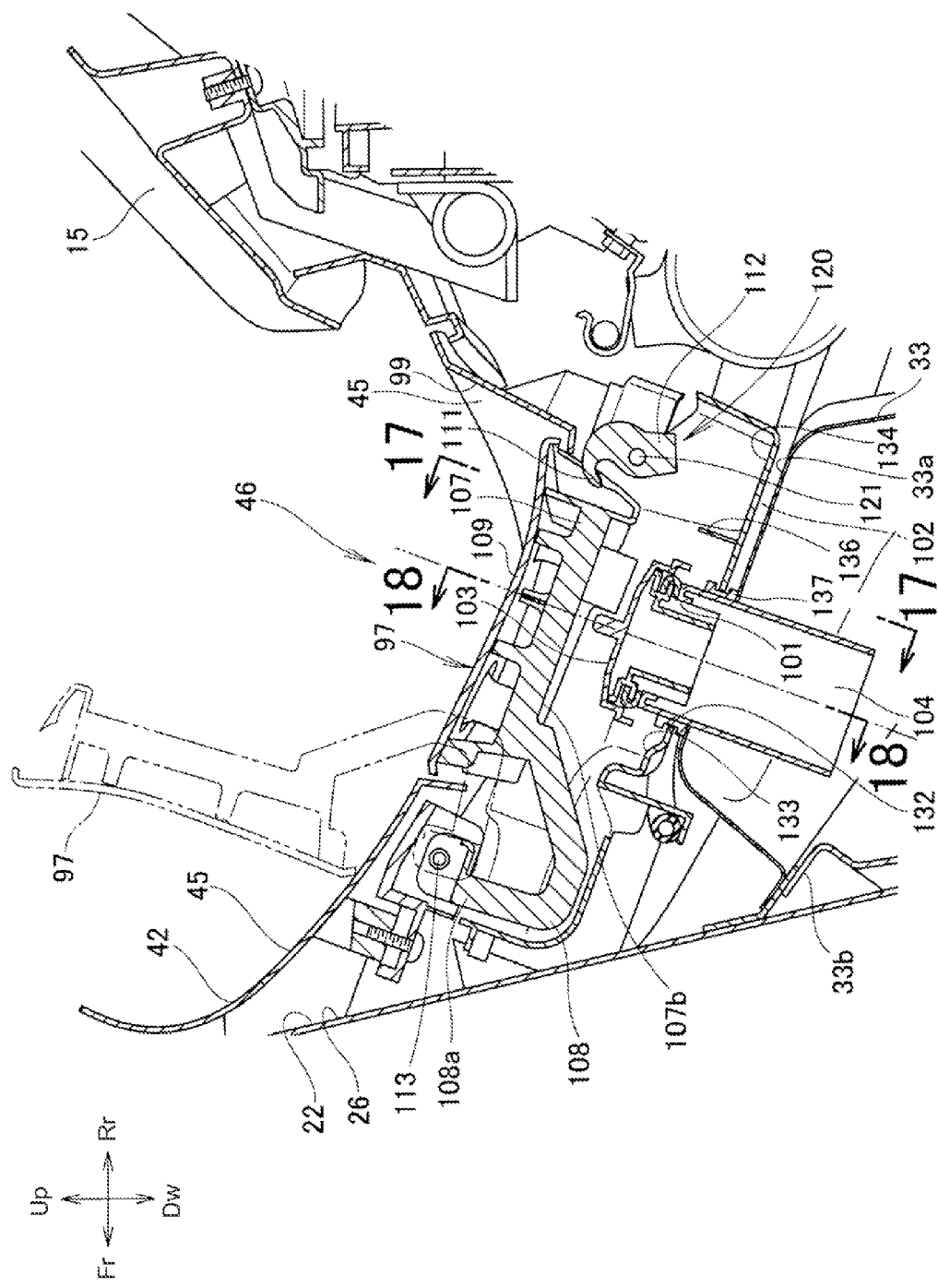
FIG. 15 is a cross-sectional view taken along line 15-15 of FIG. 12.

As shown in FIG. 15, a cylindrical member 104 having the fuel filler port 101 penetrates a hole portion 132 of the fuel tray 102. The cylindrical member 104 having the fuel filler port 101 is arranged in an upper face 33a of the fuel tank 33 arranged below the center cover 45. A sealing member 137 is fitted between the cylindrical member 104 and the hole portion 132. The fuel filler port 101 is openably closed by a fuel cap 103.

The fuel lid 97 includes a main body portion 107, and a lid arm 108 opened upward from a bottom portion 107b of the main body portion 107, and having a substantial U shape when viewed in cross-section. A ceiling portion 109 covers the main body portion 107, and an engaging portion 111 with which a later-mentioned claw portion 112 is engaged is formed on the rear end of the main body portion 107.

A lid hinge shaft 113 is inserted horizontally in the vehicle width direction into a tip end 108a of the lid arm 108. The lid hinge shaft 113 is attached to the center cover 45, and rotatably supports the fuel lid 97.

Also referring to FIG. 14, a locking mechanism 120 for holding the fuel lid 97 in a closed state has a lid lock shaft 121 attached to the center cover 45, the claw portion 112 rotatably supported by the lid lock shaft 121, a spring 122 biasing the claw portion 112 toward the locking side, and a lid wire cable 123 that drives the claw portion 112 to the unlock side at the time of opening the fuel lid 97.

Referring back to FIG. 14, a liquid guide portion 99a for guiding liquid to the fuel tray 102 is formed in the concave portion 99 in the center cover 45. A liquid guide rib 98, which extends in such a manner as to surround left and right sides as well as the rear of the opening 100, is provided in a standing manner in an upper portion of the liquid guide portion 99a. Notches 98a, 98a are formed in parts of a rear portion of the liquid guide rib 98, and liquid having run down the liquid guide rib 98 flows downward from the notches 98a, 98a, and is introduced to the fuel tray 102.

Figure 16:
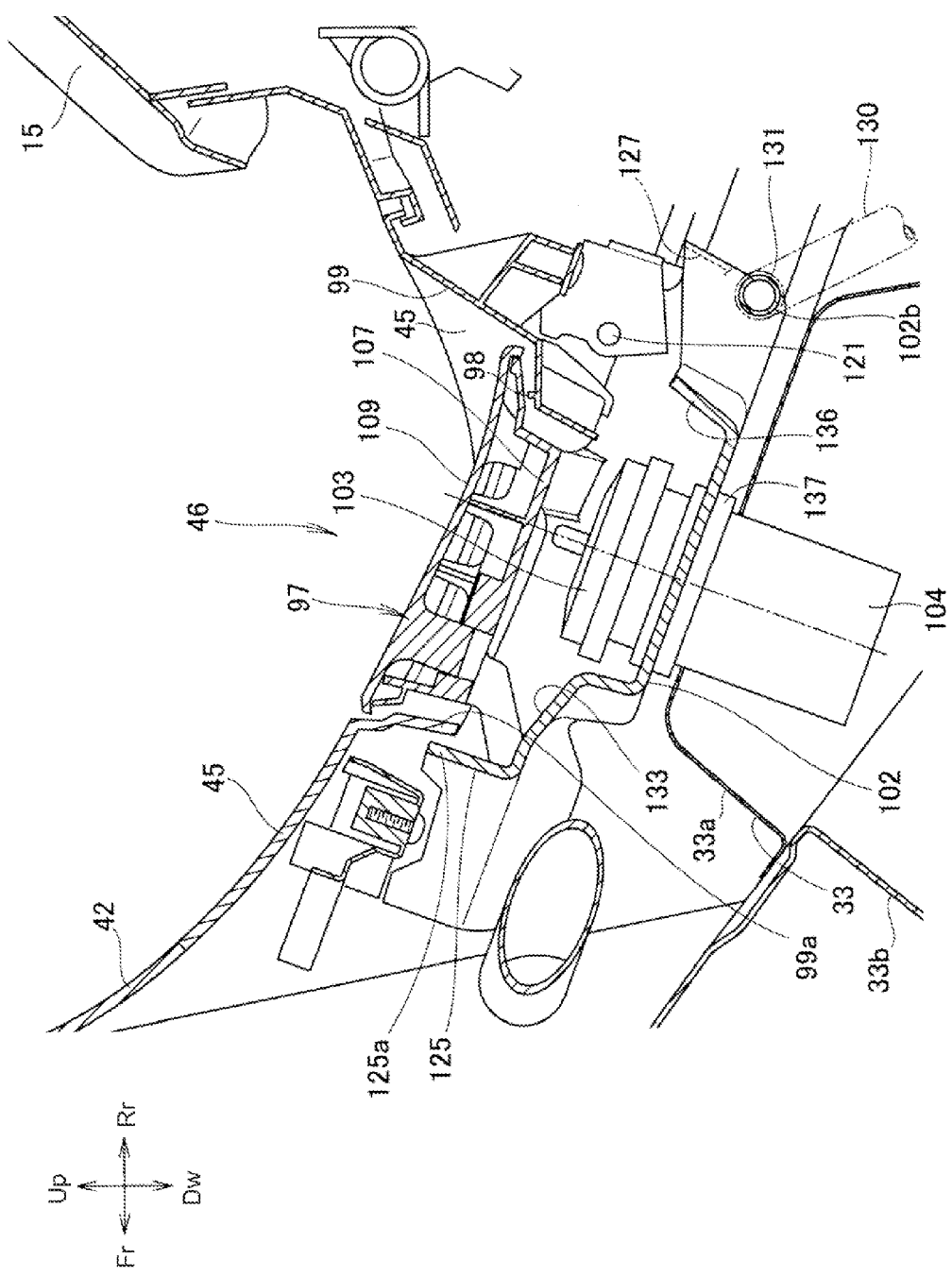
FIG. 16 is a cross-sectional view taken along line 16-16 of FIG. 12.

As shown in FIG. 16, the liquid guide portion 99a formed in the concave portion 99 of the center cover 45 has a function of guiding liquid to the fuel tray 102 arranged therebelow. The liquid guide portion 99a extends lower than an upper end 125a of a front wall 125 of the fuel tray 102. Specifically, the liquid guide portion 99a is extended in an eaves shape, in such a manner as to overlap a rear part of the front wall 125 of the fuel tray 102 in the height direction. Hence, liquid having dripped onto the liquid guide portion 99a can all be received in the fuel tray 102.

Figure 17:
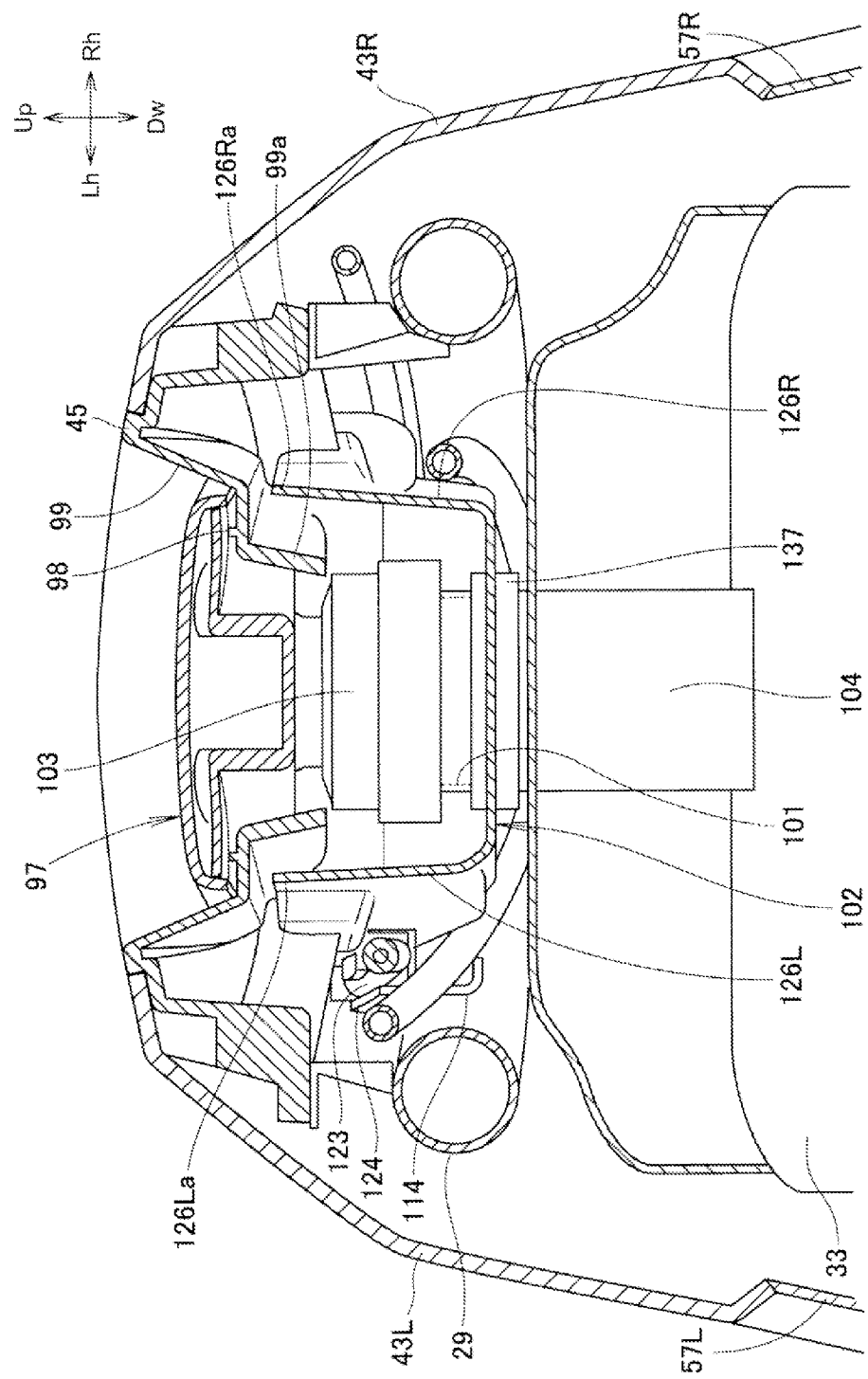
FIG. 17 is a cross-sectional view taken along line 17-17 of FIG. 15.
Figure 18:
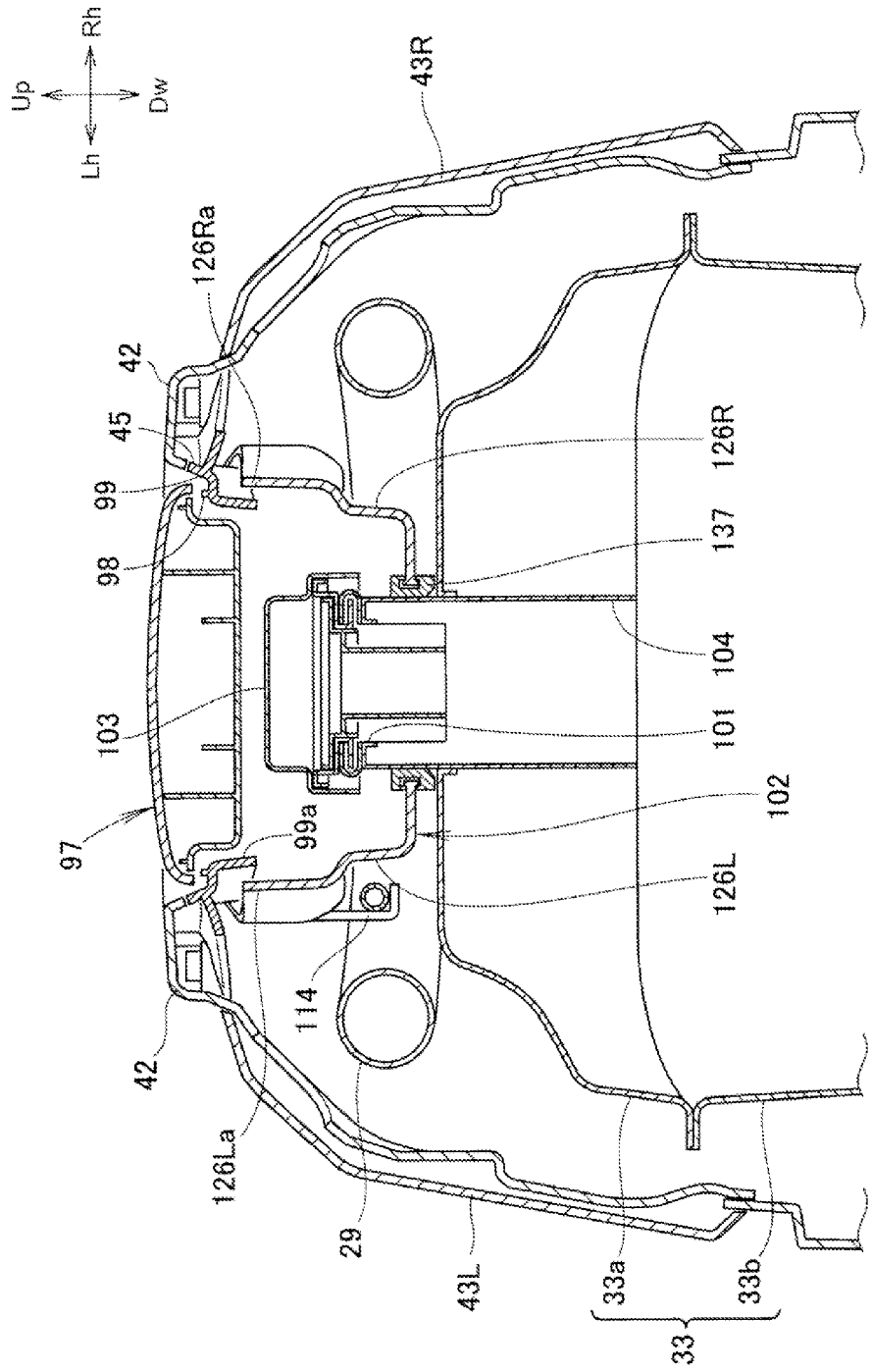
FIG. 18 is a cross-sectional view taken along line 18-18 of FIG. 15.

As shown in FIG. 17, the center cover 45 is supported by the upper frame 29. Additionally, as in the case of the aforementioned front wall 125 (see FIG. 16), the concave portion 99 provided in the center cover 45 and extending downward extends lower than each of upper ends 126La, 126Ra of left and right side walls 126L, 126R. Specifically, the liquid guide portion 99a of the concave portion 99 extends in an eaves shape lower than the upper ends 126La, 126Ra of the left and right side walls 126L, 126R, inside the left and right side walls 126L, 126R. Hence, liquid having flown to the liquid guide portion 99a can all be received in the fuel tray 102.

As shown in FIGS. 17 to 20, the fuel tray 102 has a tray main body 128 having the front wall 125, the left and right side walls 126L, 126R extending rearward from left and right end portions of the front wall 125, and a rear wall 127 bridged across the rear ends of the left and right side walls 126L, 126R and receiving spilled fuel. A lid wire guide portion 124 is fixed so as to extend in the front-rear direction on the left end of the tray main body 128, and has the lid wire cable 123 placed thereon to guide and hold the lid wire cable 123. A drain hole 131 is fixed on the rear left end of the tray main body 128 and discharging liquid pooled in the tray main body 128. A second guide portion 114 protruding downward and guiding another pipe member is fixed in the lid wire guide portion 124.

A drain pipe 130 for discharging liquid including excess fuel to the outside of the vehicle can be connected to the drain hole 131 of the fuel tray 102. Since the drain hole 131 is provided at the left end of the tray main body 128, when the vehicle is parked by setting up the side stand 49 (see FIG. 1), liquid pooled in the tray main body 128 is guided to the drain hole 131, and is smoothly discharged to the outside of the vehicle through the drain pipe 130 connected to the drain hole 131.

The hole portion 132 into which the cylindrical member 104 having the fuel filler port 101 (see FIG. 17) is inserted is formed in the tray main body 128, and a partitioning rib 136 extending in the vehicle width direction protrudes at the vehicle rear of the hole portion 132. Of parts partitioned by the partitioning rib 136, a front part of the tray main body 128 is defined as an exposed portion 133, and a rear part of the tray main body 128 is defined as a reservoir portion 134. The tray main body 128 is arranged so that its vehicle rear part is positioned lower in side view of the vehicle. A lowest point 102b of the fuel tray 102 is provided in the reservoir portion 134 arranged at the vehicle rear of the exposed portion 133, and at the vehicle rear of the hole portion 132. The fuel tank 33 is formed by butt-welding an upper half body 33a and a lower half body 33b at their flange portions.

Referring back to FIG. 14, the partitioning rib 136 separating the exposed portion 133 and the reservoir portion 134 is arranged so as to follow the shape of the rear end of the opening 100. The reservoir portion 134 can be made less recognizable from outside, since it is shielded by the downwardly extending concave portion 99 and the upwardly protruding partitioning rib 136. Meanwhile, the exposed portion 133 is recognizable from outside.

A storage box provided in a rear portion of the vehicle will be described with reference to the following FIGS. 21 to 28.

Figure 21:
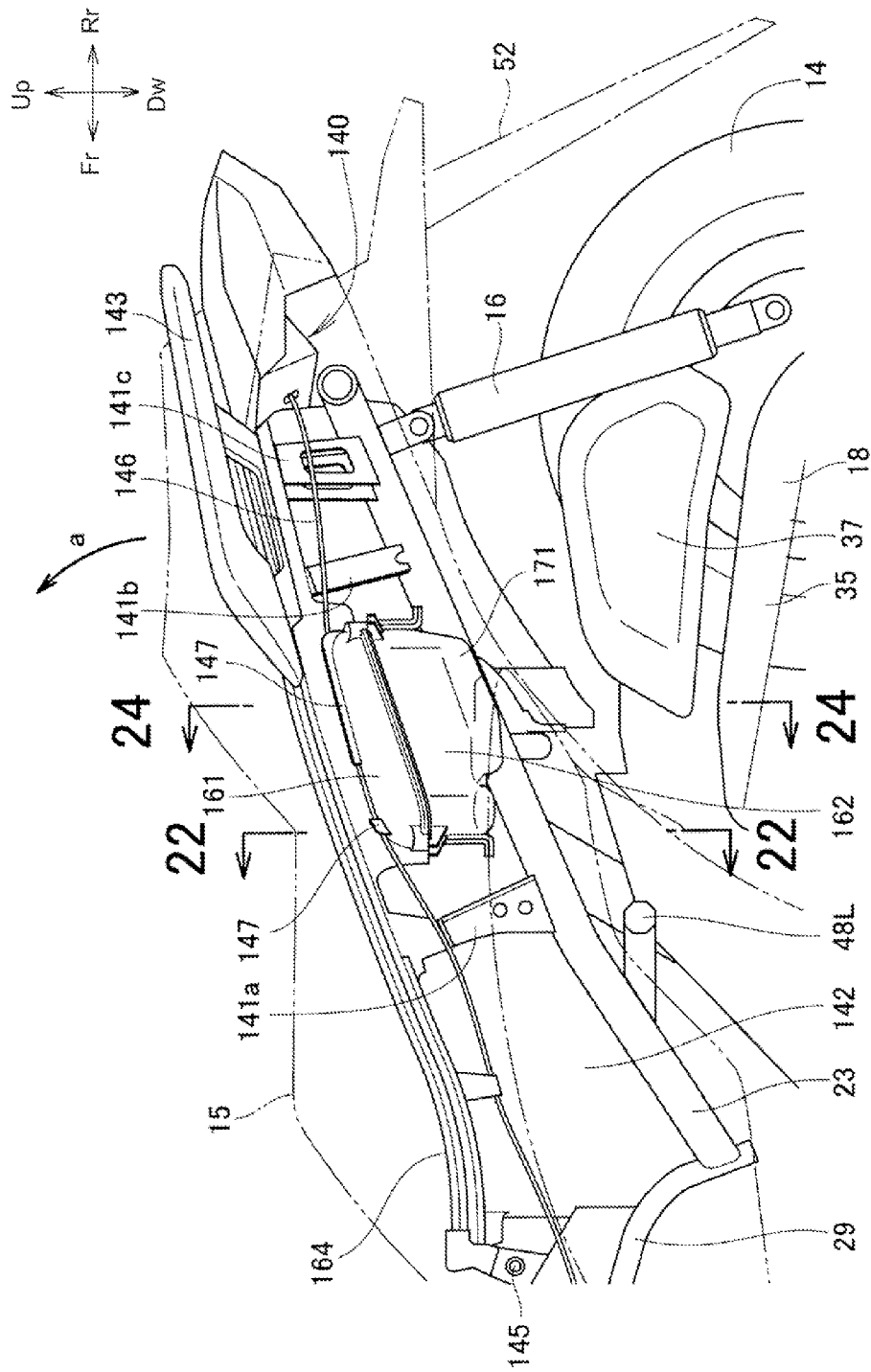
FIG. 21 is a left side view of a rear portion of the motorcycle according to the present invention.

As shown in FIG. 21, multiple supporting stays 141a to 141c protruding upward are provided in the rear frame 23, which extends obliquely upward in the rear direction of the vehicle. A storage box 142 is placed on the multiple supporting stays 141a to 141c, and the seat 15 on which the rider and/or the passenger sits is placed on the storage box 142. In addition to the storage box 142, a grab rail 143 is attached to the supporting stays 141a to 141c.

A hinge shaft 145 is provided in a front end portion of the storage box 142. The hinge shaft 145 extends horizontally in the vehicle width direction, and has the front end of the seat 15 attached thereto. Further, a seat locking mechanism 140 for openably locking the seat 15 is provided in a rear end portion of the storage box 142. A seat locking cable 146 extends toward the vehicle front from the seat locking mechanism 140.

To open the storage box 142, the core wire inside the seat locking cable 146 is pulled toward the vehicle front, and the seat 15 is rotated around the hinge shaft 145 in the direction of arrow a in FIG. 21 with the seat locking mechanism 140 switched to the unlocked from locked state, whereby an upper part of the storage box 142 is opened.

In the following FIGS. 22 to 25, the direction of arrow D indicates the direction in which a die for molding the storage box is drawn.

Figure 22:
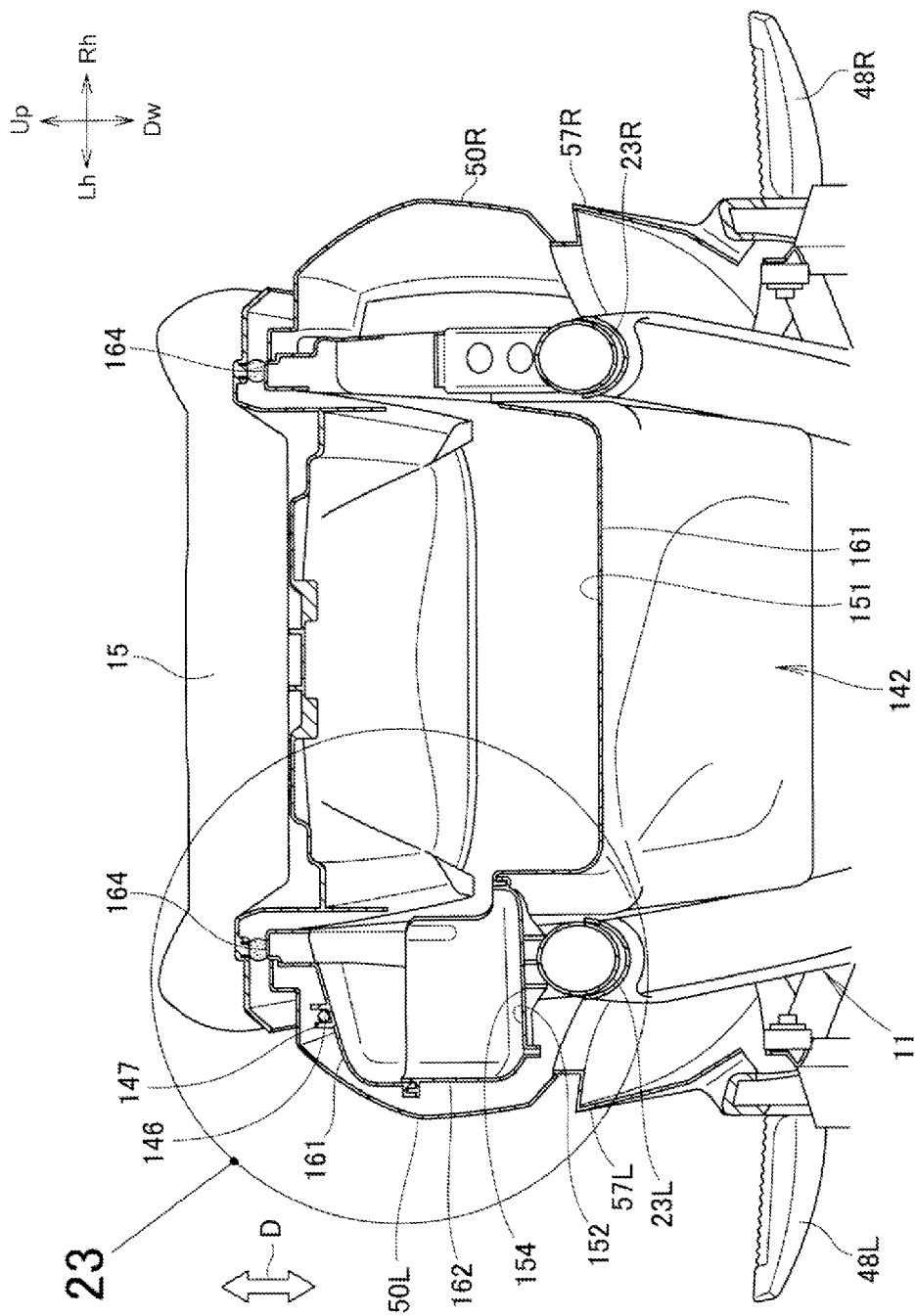
FIG. 22 is a cross-sectional view taken along line 22-22 of FIG. 21.

As shown in FIG. 22, the storage box 142 for storing articles is supported by paired left and right rear frames 23L, 23R, the seat 15 is arranged above the storage box 142, and the storage box 142 and sides of the vehicle body including the body frame 11 are covered with the rear side body covers 50L, 50R, below the seat 15.

The storage box 142 includes a first storage portion 151 provided between the paired left and right rear frames 23L, 23R. A second storage portion 152 is provided so as to bulge toward the outside of the rear frame 23 in the vehicle width direction from the first storage portion 151, and to communicate into the first storage portion 151.

The first storage portion 151 and the second storage portion 152 are formed by combining two members, which are a resin-molded first member 161 and a resin-molded second member 162. Specifically, the first storage portion 151 is formed of the first member 161, and the second storage portion 152 is formed of the first member 161 and the second member 162. Details of the second storage portion 152 formed of the first member 161 and the second member 162 will be described with reference to the following FIG. 23.

Figure 23:
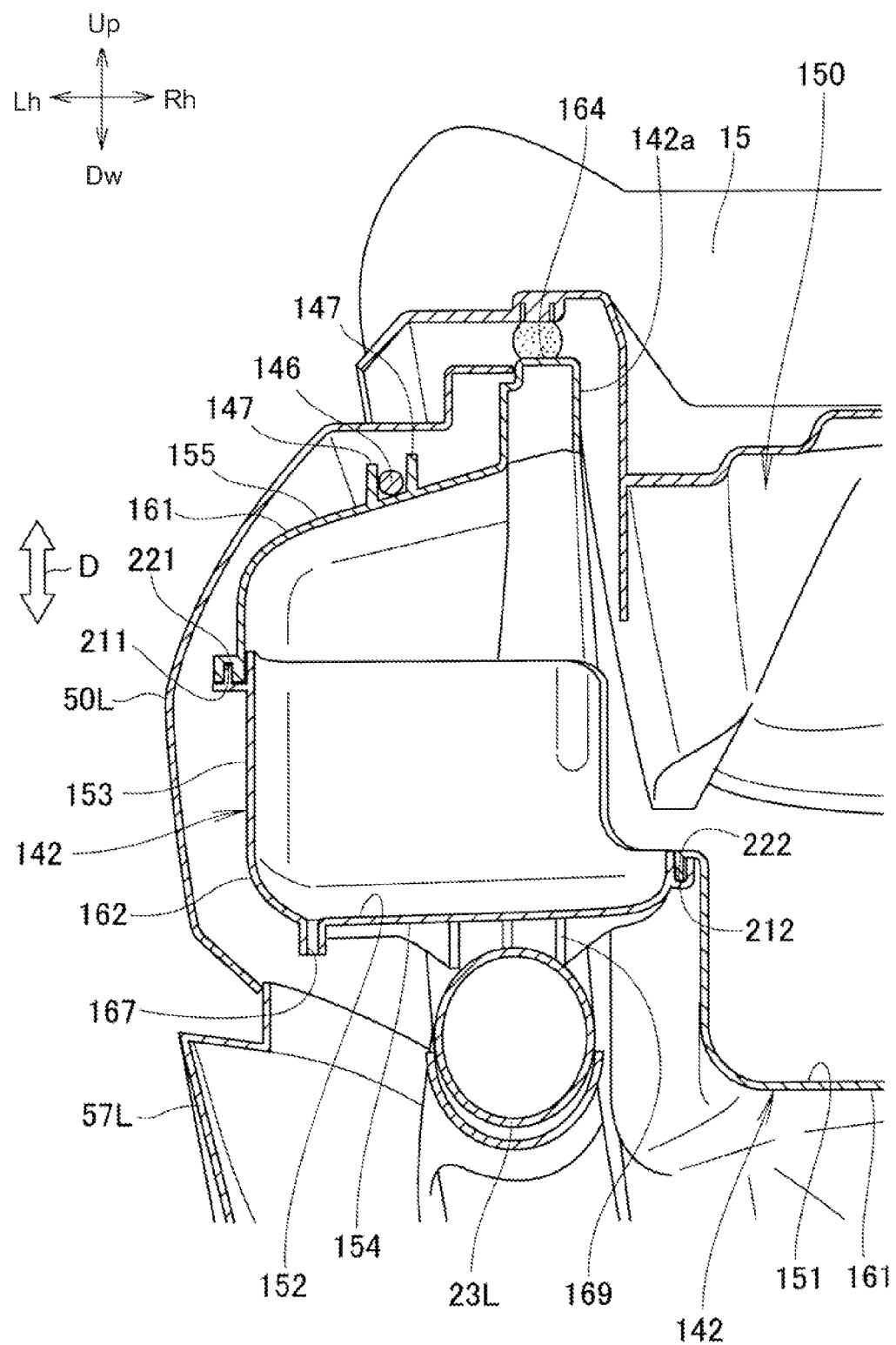
FIG. 23 is an enlarged view of part 23 of FIG. 22.

As shown in FIG. 23, the first storage portion 151 is formed of the first member 161. The second storage portion 152 is formed of the first member 161 and the second member 162. To be more precise, most of a lower portion of a side face 153 and a bottom face 154 of the second storage portion 152 are formed of the second member 162, and an upper face (ceiling face 155) of the second storage portion 152 is formed of the first member 161.

The bottom face 154 of the second storage portion 152 is configured of the second member 162 different from the first member 161 constituting the first storage portion 151, and the bottom face 154 of the second storage portion 152 constituting the bottom face of a storage portion 150 is extended further to the inside of the storage box 142 than a sealing face 164 closing an opening 142a of the storage box 142. The bottom face 154 of the second storage portion 152 abuts on the rear frame 23L through a supporting rib 169. A drain hole portion 167 for discharging water inside the storage box 142 is provided at the outer end of the bottom face 154 of the second storage portion 152 in the vehicle width direction. Since the drain hole portion 167 is provided close to the outer end of the bottom face 154 of the second storage portion 152 in the vehicle width direction, when the vehicle is tilted by setting up the side stand 49 (see FIG. 1), water gathered to the left side can be smoothly discharged to the outside of the vehicle.

A seat locking cable guide portion 147 for guiding the seat locking cable 146 is provided in the upper face (ceiling face 155) of the second storage portion 152, and the seat locking cable 146 extending in the longitudinal direction of the vehicle is disposed on the seat locking cable guide portion 147. Since the seat locking cable guide portion 147 is integrally provided in the second storage portion 152, the number of parts can be reduced as compared to a case of providing a guide member separately.

In addition, the side face 153 of the second storage portion 152 is arranged so as to follow the shape of the rear side body cover 50L. By arranging the side face 153 of the second storage portion 152 so as to follow the shape of the rear side body cover 50L, the storage volume of the second storage portion 152 can be made larger than a case where it is not arranged in this manner.

Figure 24:
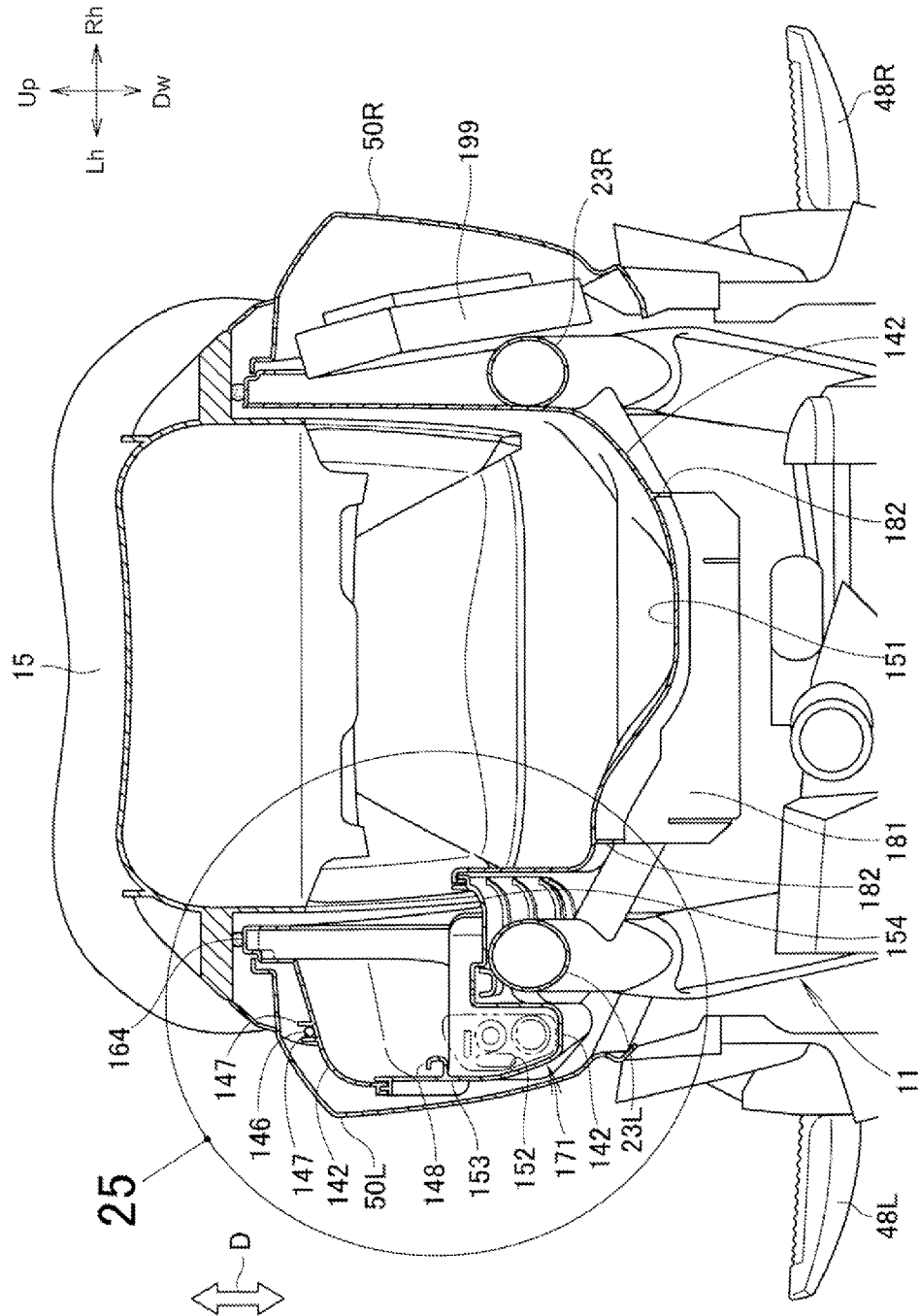
FIG. 24 is a cross-sectional view taken along line 24-24 of FIG. 21.

As shown in FIG. 24, the storage box 142 is supported by the paired left and right rear frames 23L, 23R, the seat 15 is arranged above the storage box 142, and sides of the vehicle body are covered with the rear side body covers 50L, 50R, below the seat 15.

Figure 25:
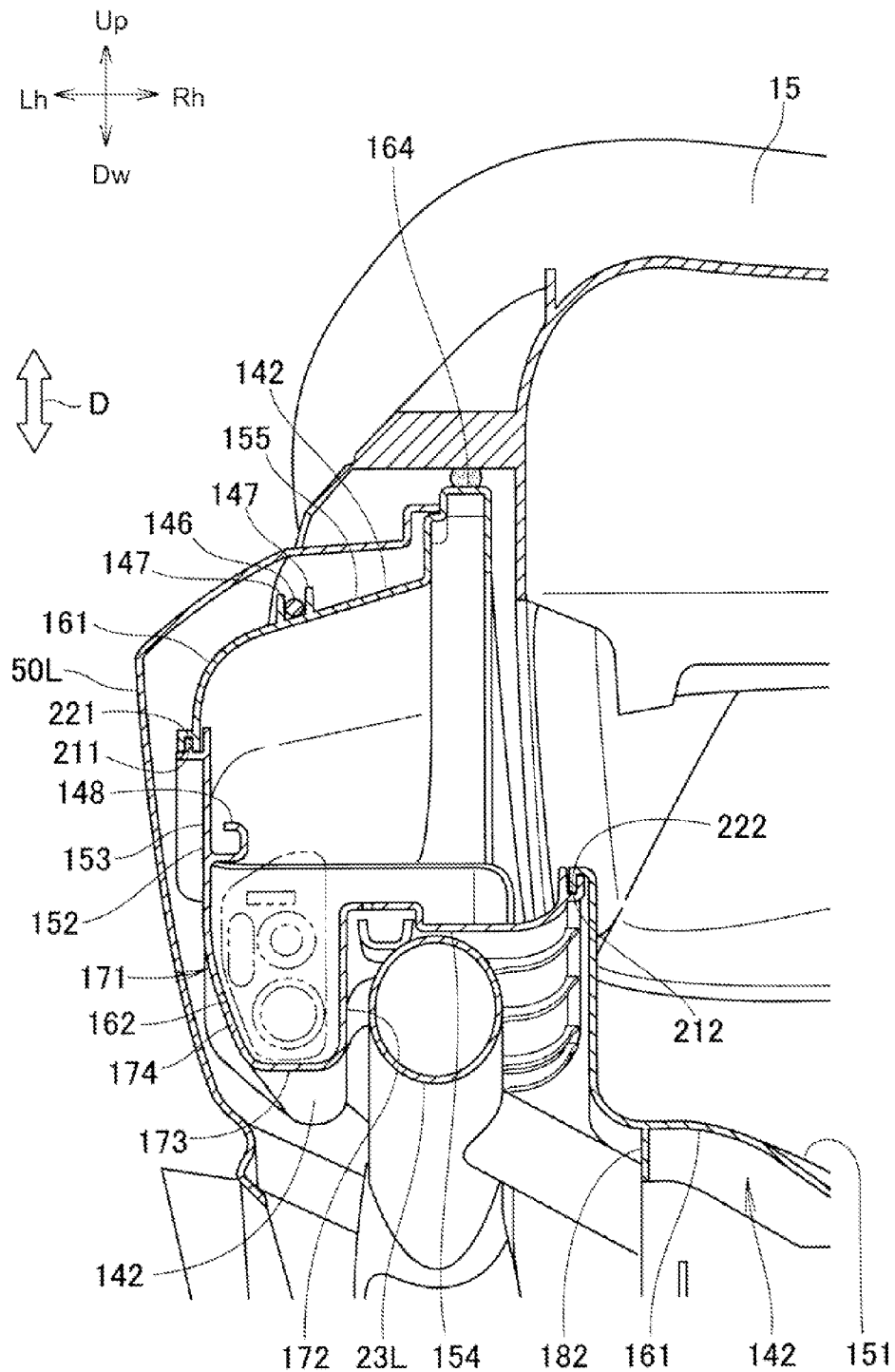
FIG. 25 is an enlarged view of part 25 of FIG. 24.

As shown in FIG. 25, a hanging portion 171 hanging outside the left rear frame 23L is provided in the second storage portion 152. The hanging portion 171 is formed of the second member 162. The hanging portion 171 has a lower vertical wall 172 hanging down from the bottom face 154 of the second storage portion 152 outside the left rear frame 23L, and a second bottom face 173 extending outward in the vehicle width direction from the lower end of the lower vertical wall 172. The hanging portion is connected to an extended side face 174, which is formed by extending the side face 153 of the second storage portion 152 downward, outside the second bottom face 173 in the vehicle width direction. The extended side face 174 is arranged so as to follow the shape of the rear side body cover 50L. Additionally, the bottom face 154 of the second storage portion 152 abuts on the rear frame 23L. A hook portion 148, which extends upward and on which a member such as a rubber baggage strap for fixing articles can be hooked, is provided on the side face 153 of the second storage portion 152. The hook portion 148 is provided in the second member 162.

Next, a description is given that the storage box has a divided structure.

Figure 26:
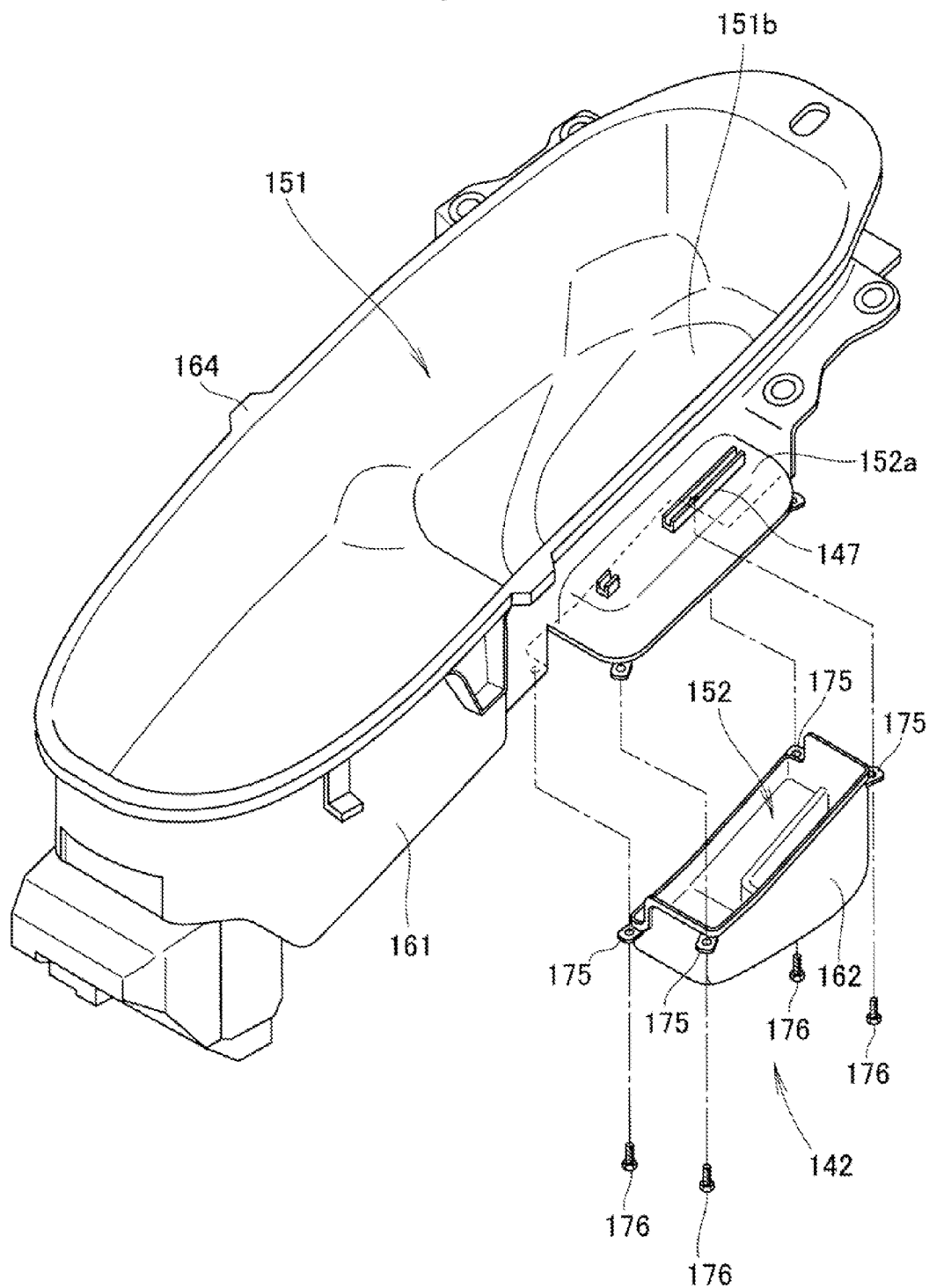
FIG. 26 is an exploded perspective view of a storage box.

As shown in FIG. 26, the second member 162 is attached to the first member 161, which constitutes a main portion of the storage box 142, by bringing flanges 175 of the second member 162 into contact with the first member 161 from below, and inserting fastening members 176 from below. In other words, the first member 161 and the second member 162 are vertically engaged and attached to each other in the height direction.

Referring back to FIGS. 23 and 25, engaging portions where the second member 162 is engaged with the first member 161 are described. A first engaging concave portion 211 is formed in the first member 161, and a first engaging convex portion 212 is formed inside the first engaging concave portion 211 in the vehicle width direction. A second engaging convex portion 221 and a second engaging concave portion 222 inside the second engaging convex portion 221 in the vehicle width direction are formed in the second member 162. Then, the second member 162 is assembled onto the first member 161 by engaging the second engaging convex portion 221 with the first engaging concave portion 211, and engaging the second engaging concave portion 222 with the first engaging convex portion 212.

Next, a description is given that ribs for avoiding mud splash from the rear wheel are fixed on a bottom portion of the storage box 142.

Figure 27:
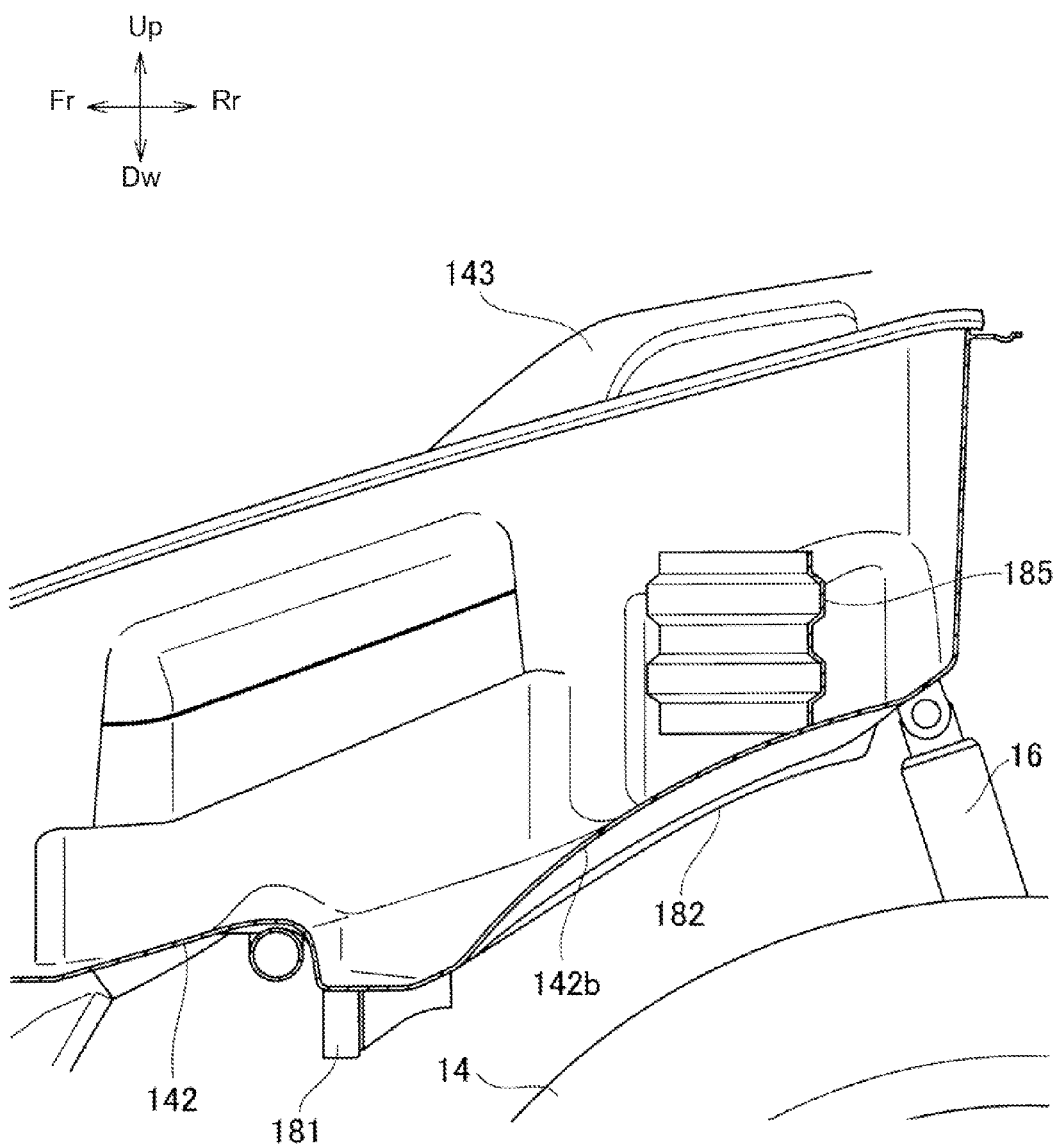
FIG. 27 is a cross-sectional view of a side portion of the storage box for describing a mudguard rib.

FIG. 27 is a cross-sectional view of the storage box 142 taken along its centerline in the vehicle width direction. As shown in FIG. 27, a mudguard 181 for keeping mud splashed from the rear wheel 14 from splashing to the vehicle front is attached to a bottom face 142b of the storage box 142, and a mudguard rib 182 for reinforcing the bottom face 142b of the storage box 142 as well as keeping mud splashed from the rear wheel 14 from splashing to the side of the vehicle, is hung from the bottom face 142b of the storage box 142 so as to be continuous with the mudguard 181, outside the rear wheel 14 in the vehicle width direction and along the rear wheel 14 in the longitudinal front-rear direction of the vehicle. The mudguard 181 and the mudguard rib 182 provided in the bottom face 142b of the storage box 142 can suppress mud splash from the rear wheel 14.

Next, partition plates partitioning the inside of the storage box 142 will be described.

Figure 28:
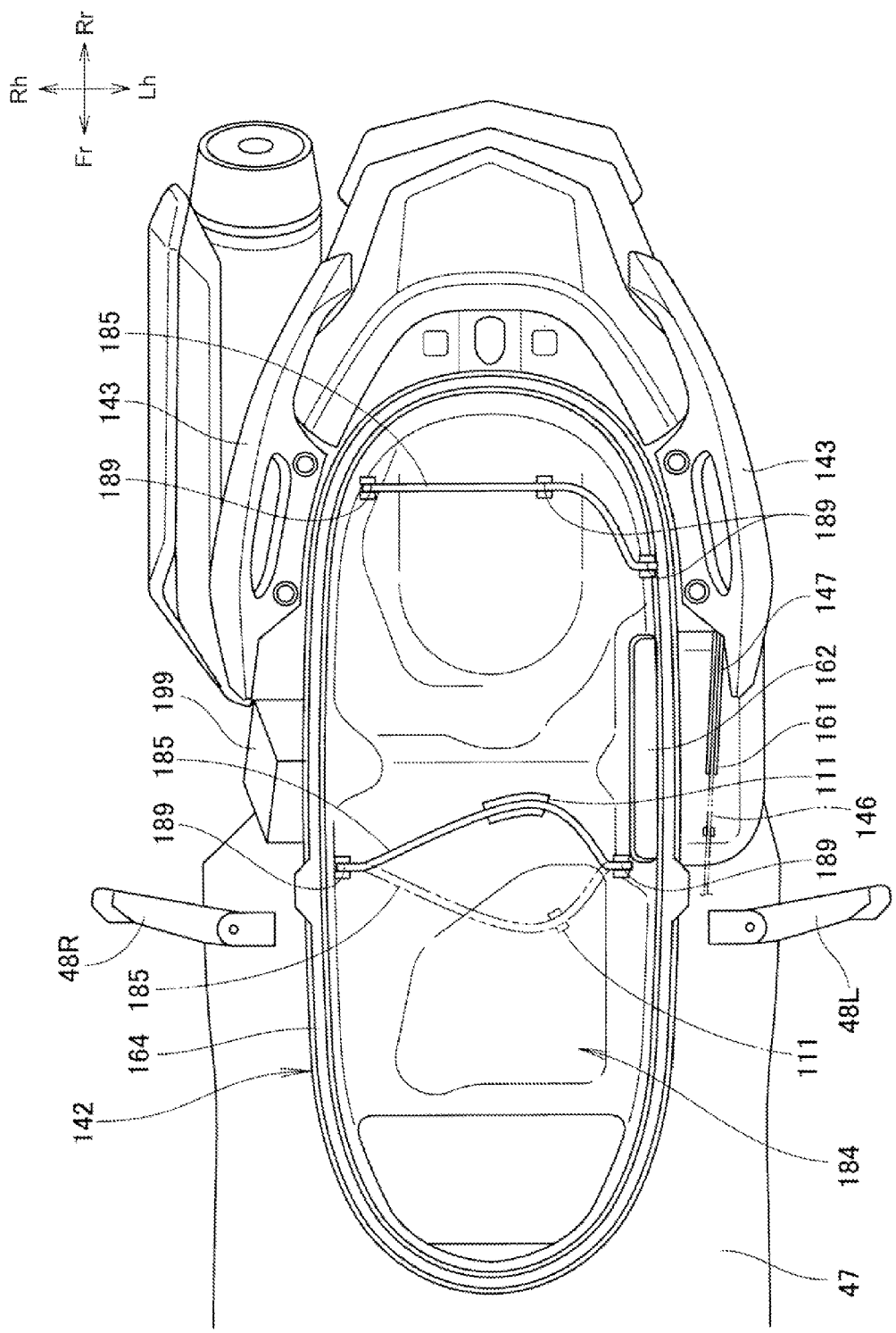
FIG. 28 is a plan view of the storage box having detachable partition plates.

As shown in FIG. 28, the storage box 142 includes the annular sealing face 164 on which the seat 15 (see FIG. 1) is placed in plan view of the vehicle, and the inside of the sealing face 164 is defined as a storage portion 184. Multiple locking portions 189 with which partition plates 185 can be engaged are fixed to the storage portion 184, and the partition plates 185 are detachably inserted into the locking portions 189. By inserting the partition plates 185, articles can be prevented from moving and getting scattered during travel. Additionally, articles can be stored according to their various different shapes. Note that an ECU unit 199 is arranged on the right side of the storage box 142.

Effects of the above-described motorcycle are as follows.

First, as shown in FIG. 5, the duct 77 extending to the rear side 55b of the screen 55 from the air intake 76 is provided at the vehicle rear of the visor 56. Apart of traveling wind taken in from the air intake 76 passes through the duct 77 and is guided to the rear side of the screen 55, which is the rear side 55b of the screen 55, while a part of traveling wind taken in from the air intake 76 flows to the front of the screen 55, which is the front face of the screen 55. Since the duct 77 allows traveling wind to flow to the rear of the screen 55, the amount of traveling wind passing through between the visor 56 and the screen 55 can be reduced.

The amount of traveling wind passing through between the visor 56 and the screen 55 is reduced, and traveling wind taken in from the air intake 76 passes through the duct 77 and is guided to the rear side of the screen 55. In this case, the amount of traveling wind being guided to the rear of the screen does not vary largely even when the screen 55 is slid upward or downward, and thus traveling wind can be constantly guided to the rear of the screen 55.

Second, the length of the duct 77 overlaps the movable range in which the lower end 55d of the screen 55 slides, and is longer than the movable range of the screen 55.

As shown in FIGS. 6(a) to 6(c), when the screen 55 is in the uppermost sliding position of the screen 55, it is positioned between an upper end 77a and lower end 77b of the duct 77. Similarly, as shown in FIGS. 7(a) to 7(c), when the lower end 55d of the screen 55 is in the lowermost sliding position of the screen 55, it is also positioned between the upper end 77a and lower end 77b of the duct 77.

To be specific, since the upper end 77a of the duct 77 is positioned higher than the lower end 55d of the screen 55, traveling wind taken in from the air intake 76 is guided to the rear side 55b of the screen 55 regardless of whether the screen is at the upper end or is at the lower end, and thus its amount is less likely to vary. In other words, the amount of traveling wind flowing to the rear of the screen 55 does not vary largely even when the screen 55 is slid to a different position, and thus traveling wind can be constantly guided to the rear of the screen. As a result, ease in steering can be enhanced while maintaining a predetermined windbreak performance.

Third, as shown in FIGS. 4 and 10, the rails 64 supporting the screen 55 in a vertically slidable manner are arranged so as to incline along the front face 54a of the meter panel 54. As shown in FIG. 5, since the rail 64 and the screen 55 are formed so as to follow the curved shape of the meter panel 54, the gap δ1 between the screen 55 and the visor 56 as well as the gap δ2 between the screen 55 and the duct upper face can be reduced.

It is possible to suppress variation in the amount of traveling wind flowing through between the screen 55 and the visor 56, as well as between the screen 55 and the upper face of the duct 77, if the gaps δ1, δ2 are reduced. Since the gaps δ1, δ2 are small, variation in the amount of traveling wind is small even when the screen 55 is slid vertically. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance. In addition, reduction in the gaps δ1, δ2 can reduce the size of the front portion of the vehicle. Further, reduction in the gap δ1 makes parts inside the visor 56 less recognizable from between the screen 55 and the visor 56, and thus appearance is improved.

Fourth, as shown in FIG. 3, the visor 56 overlapping the duct 77 and the rails 64 (64L, 64R) is formed of a member less transmissive than the screen 55. The visor 56 using the low-transmittance member can cover up the duct 77 and the rail 64, so that appearance of the vehicle can be improved.

Fifth, the duct 77 is arranged between the paired left and right rails 64L, 64R. If the duct 77 can be formed thinner than the rails 64, the visor 56 can be arranged closer to the rails 64.

Moreover, since the duct 77 is arranged between the paired left and right rails 64L, 64R, limited space can be utilized effectively.

Conventionally, in a screen slide mechanism using an air cylinder, for example, the size of the slide mechanism tended to become large, and the slide stroke of the screen was limited.

Meanwhile, the present invention does not use an air cylinder but uses the left and right rails 64 for sliding the screen 55, whereby the screen mechanism can be reduced in size. Reduction in the size of the screen mechanism and effective utilization of space allows more freedom in designing the front portion of the vehicle. As a result, appearance of the vehicle can be improved more easily.

Sixth, as shown in FIG. 5, the duct 77 includes the curved portion 78 that comes closer to the visor 56 as it approaches the air intake 76. Since the duct 77 comes close to the visor 56 around the air intake 76, a gap δ3 between the duct 77 and the visor 56 can be reduced. Reduction in the gap δ3 allows a larger amount of traveling wind to be taken into the duct 77 from the air intake 76. It is possible to suppress variation in the amount of traveling wind flowing through between the screen 55 and the visor 56, as well as between the upper face of the duct 77 and the screen 55, even when the screen 55 is slid vertically and the position of the screen 55 varies vertically. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance.

Seventh, as shown in FIG. 8, the lower edge 93 of the screen 55 is formed so as to follow the shape of the mirror covers 65L, 65R. Since the lower edge 93 of the screen 55 is formed so as to follow the shape of the mirror covers 65L, 65R, the lower edge 93 of the screen 55 can be brought closer to the mirror covers 65L, 65R when the screen 55 is moved downward. Additionally, the movable range in which the screen 55 slides can be made larger than a case where the lower edge of the screen is formed so as not to follow the shape of the mirror cover. As a result, the windbreak performance of the screen 55 can be enhanced.

Figure 11:
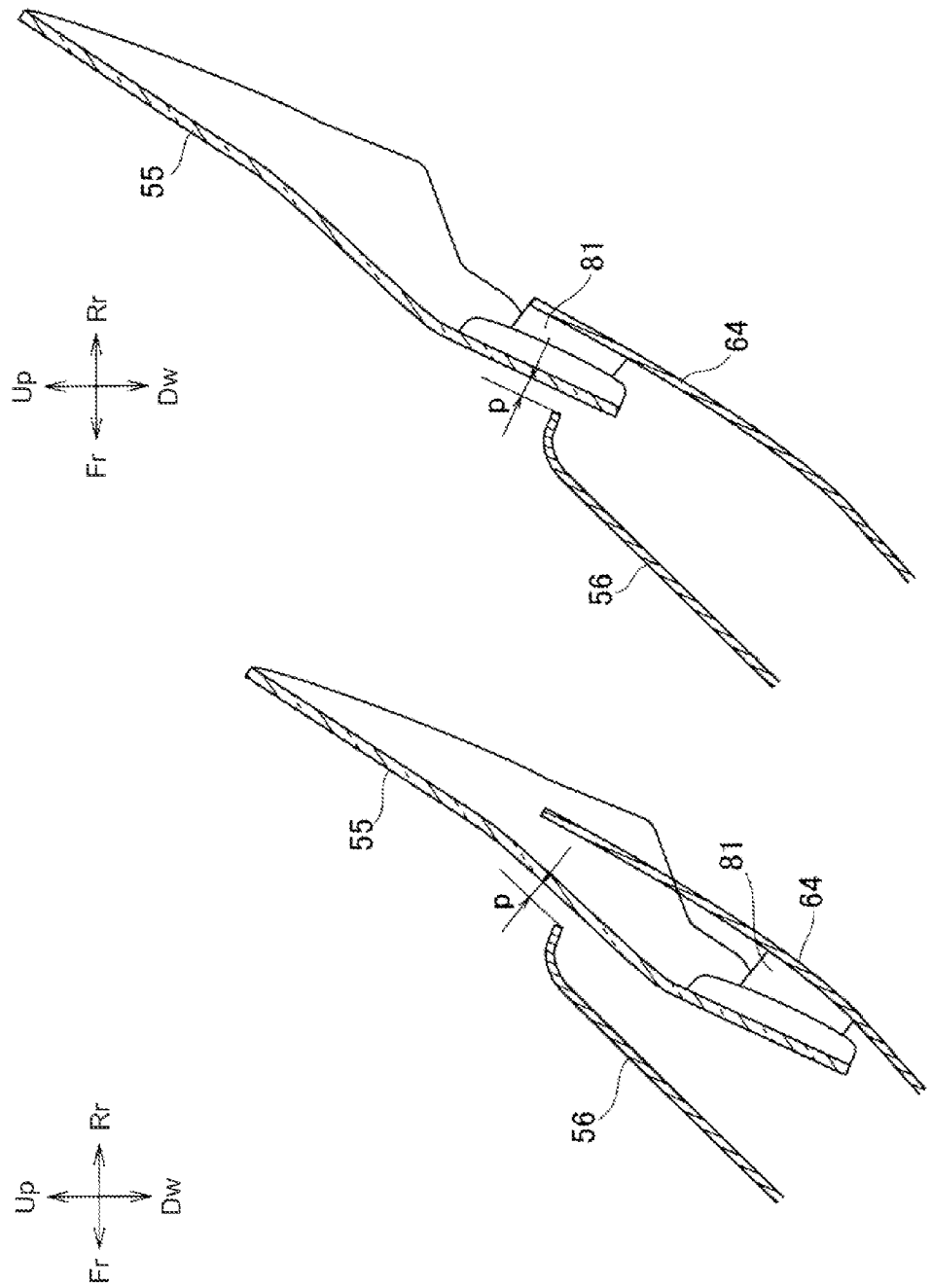
FIGS. 11(a) and 11(b) are views for describing a screen supporting structure according to a modified example and its effect.

Eighth, as shown in FIG. 11, in side view, the rail 64 is curved in such a manner as to protrude downward, and the screen 55 is curved in such a manner as to protrude upward.

As shown in FIGS. 11(a) and 11(b), by assigning predetermined curvatures to the rail 64 and the screen 55, the gap p formed between an upper end 56a of the visor 56 and the screen 55 can be kept as close as possible and maintained to be constant even in the state when screen 55 slides. A part of traveling wind having entered from the air intake 76 flows through between the visor 56 and the screen 55 without entering the duct 77. At this time, since the gap p between the upper end 56a of the visor 56 and the screen 55 is small, and variation in the gap p caused by sliding of the screen 55 is kept small, the flow amount of traveling wind can be suppressed. Accordingly, the amount of traveling wind flowing to the rear of the screen does not vary largely, so that traveling wind can be constantly guided to the rear of the screen. As a result, ease in steering can be enhanced even more while maintaining a predetermined windbreak performance. Additionally, since variation in the gap p can be reduced, the inner structure of the visor 56 can be made less recognizable from the gap p between the visor 56 and the screen 55. Hence, appearance is improved.

Ninth, as shown in FIG. 16, the fuel lid 97 is provided so as to be accommodated in the concave portion 99 formed in the center cover 45.

If the fuel lid is to be arranged flush with the upper face of the center cover when it is arranged in the straddle space, the dimensional tolerance of the center cover and the fuel lid needs to be kept within a predetermined tolerance. Molding accuracy of the center cover and the fuel lid needs to be improved to keep the dimensional tolerance within the predetermined tolerance, which tends to increase cost.

Meanwhile, since the fuel lid 97 of the present invention is provided so as to be accommodated in the concave portion 99 formed in the center cover 45, the dimensional tolerance of the fuel lid 97 in the height direction can be made larger than the structure where the fuel lid is arranged flush with the upper face of the center cover. The fuel lid 97 can be manufactured at a lower cost because of the enlargement in dimensional tolerance.

Referring to FIG. 13, since the concave portion 99 depressed downward is provided in the center portion of the center cover 45 in the vehicle width direction, the shape of the straddle portion (straddle space 46) can have a unique appearance.

Tenth, the inner panel 42, which constitutes the straddle space 46 and extends downward toward the center cover 45 to be connected to the outer edge 99f of the concave portion 99, is provided at the vehicle front of the left and right side body covers 43L, 43R. Specifically, since the inner panel 42 is connected to the outer edge 99f of the concave portion 99, the shape of the concave portion 99 formed in the center portion of the straddle space 46 can be enhanced, as compared to a structure where the inner panel is not connected to the outer edge of the concave portion. As a result, the shape around the motorcycle straddle portion (straddle space 46) can have an even more unique appearance.

Eleventh, as shown in FIG. 14, the liquid guide rib 98 for guiding liquid to the fuel tray 102 is formed in the concave portion 99 in the center cover 45. The liquid guide rib 98 guides liquid such as rainwater pooled in the concave portion 99 of the center cover 45 to the fuel tray 102, through the notches 98a. Not only excess fuel flown into the fuel tray 102, but also liquid such as rainwater pooled in the concave portion 99 of the center cover 45 is discharged to the outside of the vehicle through the fuel tray 102. Hence, attached dust or dirt and pooled excess fuel having flown into the fuel tray 102 are likely to be effectively discharged to the outside of the vehicle. Accordingly, dirt on the fuel tray 102 can be made less recognizable when the fuel lid 97 is opened, and appearance of the fuel tray 102 can be improved.

Figure 19:
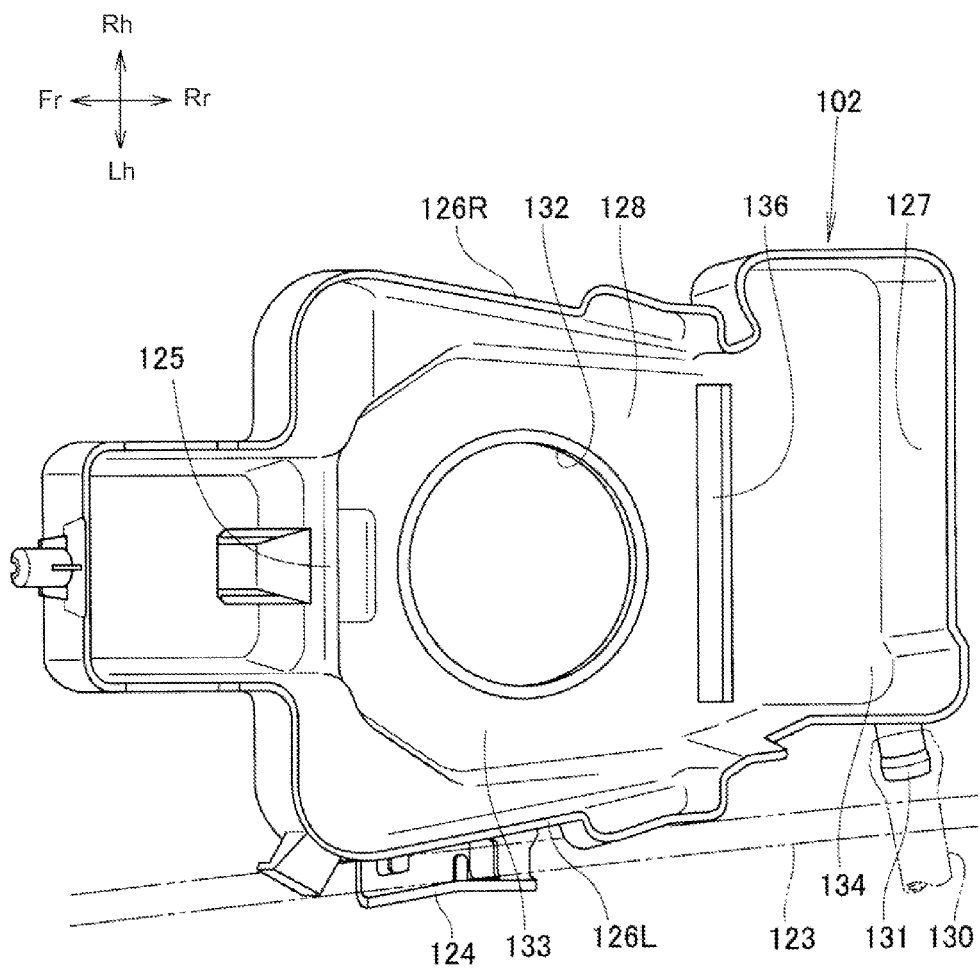
FIG. 19 is a plan view of the vehicle showing a fuel tray.

Twelfth, as shown in FIGS. 14 and 19, the partitioning rib 136 protruding upward is provided in the fuel tray 102. The reservoir portion 134 can be made less recognizable from the outside by partitioning the periphery of the fuel filler port 101 by the partitioning rib 136. Even when the fuel lid 97 is opened, the reservoir portion 134 is less recognizable and only the exterior portion (exposed portion 133) of the fuel tray 102 is exposed, so that dirt on the fuel tray 102 can be made less recognizable. Consequently, appearance of the fuel tray 102 can be improved.

Thirteenth, as shown in FIGS. 14 and 19, the lowest point 102b of the fuel tray 102 is provided in the reservoir portion 134 at the vehicle rear of the opening 100. Since the lowest point 102b of the fuel tray 102 is provided behind the opening 100, liquid pooled in the fuel tray 102 can be gathered in a position not facing the opening 100. Hence, dirt on the fuel tray 102 can be made less recognizable when the fuel lid 97 is opened. Consequently, appearance of the fuel tray 102 can be improved even more.

Fourteenth, as shown in FIGS. 21 to 23, the storage box 142 includes the first storage portion 151 provided between the rear frames 23L, 23R, and the second storage portion 152 provided so as to bulge toward the outside of the rear frame 23L, which is provided outside the first storage portion 151 in the vehicle width direction.

The first storage portion 151 and the upper face (ceiling face 155) of the second storage portion 152 are formed of the first member 161, whereas the side face 153 and the bottom face 154 of the second storage portion 152 are formed of the second member 162. The first member 161 and the second member 162 are vertically engaged with each other and constitute the storage box 142. In other words, the second storage portion 152 is formed of divided upper and lower portions, which are the first member 161 and the second member 162. Moreover, the hanging portion 171 hanging down toward the lower part of the rear frame 23L is provided in the second member 162, outside the rear frame 23L in the vehicle width direction.

By configuring the first storage portion 151 and the second storage portion 152 by combining two members, which are the first member 161 and the second member 162, as well as providing the hanging portion 171 in the second member 162, the space outside the rear frame in the vehicle width direction can be utilized effectively as storage space.

Fifteenth, the bottom face 154 of the second storage portion 152 abuts on the rear frame 23L. That is, since the bottom face 154 of the second storage portion 152 is supported by the rear frame 23L, heavy goods can be mounted in the second storage portion 152. As a result, loading capacity can be improved.

Sixteenth, the side face 153 of the second storage portion 152 is arranged so as to follow the shape of the rear side body cover 50L. With this, the second storage portion 152 can be arranged as close as possible to the rear side body cover 50L. Consequently, storage space can be enlarged without expanding the vehicle body in the vehicle width direction.

Seventeenth, the second member 162 constituting the bottom face 154 of the second storage portion 152 extends to the inside of the sealing face 164. Specifically, the second member 162 is attached to a position where it digs into the first member 161 constituting the first storage portion 151. Accordingly, rigidity of the second member 162 can be enhanced as compared to a structure where the second member is simply attached from the side of the first member. Enhanced rigidity of the second member 162 allows heavy goods to be mounted in the second storage portion 152. Consequently, loading capacity can be improved even more.

Eighteenth, the seat locking cable guide portion 147 for guiding the seat locking cable 146 is disposed on the upper face 155 of the second storage portion 152. To be specific, the seat locking cable guide portion 147 is disposed between the upper face 155 of the second storage portion 152 and the rear side body cover 50L, whereby the space between the upper face 155 of the second storage portion 152 and the rear side body cover 50L can be utilized effectively.

Nineteenth, as shown in FIG. 24, the upper face 155 of the second storage portion 152 is formed of the first member 161, whereas the side face 153 and the bottom face 154 of the second storage portion 152 are formed of the second member 162, and the hook portion 148 extending upward is provided in the second member 162. In other words, the hook portion 148 is provided in the second storage portion 152 divided into upper and lower parts. Articles stored in the second storage portion 152 can be fixed by the hook portion 148. Consequently, loading capacity can be improved.

Twentieth, as shown in FIG. 21, the pillion steps 48L, 48R are arranged at the vehicle front of the second storage portion 152. Specifically, the second storage portion 152 is arranged in a position not interfering with the foot of the passenger, and thus the second storage portion 152 can be enlarged while maintaining comfort of the passenger. As a result, storage space of the storage portion 150 can be enlarged without expanding the vehicle width.

Note that although the present invention has been applied to a motorcycle in the disclosed embodiments, it is also applicable to a tricycle, and can be applied to a general vehicle.

The present invention is suitable for a motorcycle including a screen.

DESCRIPTION OF REFERENCE NUMERALS

10 . . . motorcycle, 21 . . . head pipe, 31 . . . handle, 54 . . . meter panel, 55 . . . screen, 55b . . . rear face of screen, 56 . . . visor, 64L, 64R . . . left and right rails, 65L, 65R . . . left and right mirrors, 76 . . . air intake, 77 . . . duct, 78 . . . curved portion, 93 . . . lower edge of screen.

The invention claimed is:

1. A motorcycle, comprising:
   a handle supported by a head pipe and configured to be steered by a rider;
   a screen disposed at a vehicle front of the handle and configured to shield traveling wind directed to said rider;
   a meter panel disposed toward a vehicle front of the rider;
   a visor disposed at the vehicle front of the meter panel and configured to shield meter equipment on the meter panel from solar radiation, wherein, said visor is disposed higher than said meter panel and comprising an air intake configured to take in traveling wind between said visor and said meter panel; and
   a duct extending to a rear face of said screen from said air intake, the duct being provided at a vehicle rear of said visor, so that the duct is configured to introduce said traveling wind to the rear face of said screen,
   wherein a length of said duct overlaps a movable range in which a lower end of said screen slides, and is longer than the movable range.

2. A motorcycle, comprising:
   a handle supported by a head pipe and configured to be steered by a rider;
   a screen disposed at a vehicle front of the handle and configured to shield traveling wind directed to said rider;
   a meter panel disposed toward a vehicle front of the rider;
   a visor disposed at the vehicle front of the meter panel and configured to shield meter equipment on the meter panel from solar radiation, wherein, said visor is disposed higher than said meter panel and comprising an air intake configured to take in traveling wind between said visor and said meter panel; and
   a duct extending to a rear face of said screen from said air intake, the duct being provided at a vehicle rear of said visor, so that the duct is configured to introduce said traveling wind to the rear face of said screen,
   wherein said meter panel is provided at a position lower than said screen, said motorcycle further comprising:
   a rail configured to allow said screen to slide vertically, said rail being disposed on a head pipe side, said rail being configured so as to incline along a front face of said meter panel,
   wherein said visor covers the vehicle front of said screen.

3. The motorcycle according to claim 2, wherein said visor overlaps said duct and said rail in front view of the vehicle, and comprises a member less transmissive than said screen.

4. The motorcycle according to claim 2, wherein:
   said rail comprises a left and right rail pair; and wherein said duct is disposed between rails of said left and right rail pair.

5. The motorcycle according to claim 2, wherein said duct includes a curved portion curved so as to become closer to said visor as it approaches said air intake.

6. The motorcycle according to claim 2, wherein said rail is curved in a side view in such a manner as to protrude downward, and wherein said screen is curved in such a manner as to protrude upward.

7. A motorcycle, comprising:
   handle means for steering the motorcycle, said handle means supported by head pipe means;
   screen means disposed at a vehicle front of the handle means, said screen means for shielding traveling wind directed to a rider;
   meter panel means for supporting meter equipment thereupon, said meter panel means disposed in front of a rider position; and
   visor means for shielding solar radiation from the meter equipment, said visor means disposed at a vehicle front of the meter panel means, wherein
   said visor means is disposed higher than said meter panel means, and comprising air intake means for taking in traveling wind between the visor means and the meter panel means; and
   duct means extending to a rear face of said screen means from said air intake means, said duct means being provided at a vehicle rear of said visor means, said duct means for introducing the traveling wind to the rear face of the screen means,
   wherein a length of said duct means overlaps a movable range in which a lower end of said screen means slides, and is longer than the movable range.

8. A motorcycle, comprising:
   handle means for steering the motorcycle, said handle means supported by head pipe means;
   screen means disposed at a vehicle front of the handle means, said screen means for shielding traveling wind directed to a rider;
   meter panel means for supporting meter equipment thereupon, said meter panel means disposed in front of a rider position; and
   visor means for shielding solar radiation from the meter equipment, said visor means disposed at a vehicle front of the meter panel means, wherein
   said visor means is disposed higher than said meter panel means, and comprising air intake means for taking in traveling wind between the visor means and the meter panel means; and
   duct means extending to a rear face of said screen means from said air intake means, said duct means being provided at a vehicle rear of said visor means, said duct means for introducing the traveling wind to the rear face of the screen means,
   wherein said meter panel means is provided at a position lower than said screen means, said motorcycle further comprising:
   rail means for allowing said screen means to slide vertically, said rail means being arranged on a head pipe side, said rail means being configured to incline along a front face of the meter panel means, and
   wherein said visor means is for covering the vehicle front of said screen means.

9. The motorcycle according to claim 8, wherein said visor means overlaps said duct means and said rail means in front view of the motorcycle, said visor means comprising a member which is less transmissive than said screen means.

10. The motorcycle according to claim 8, wherein said rail means comprises right and left rails, and wherein said duct means is disposed between the right and left rails.

11. The motorcycle according to claim 8, wherein said duct means includes a curved portion which is curved so as to become closer to said visor means as it approaches the air intake means.

12. The motorcycle according to claim 8, wherein said rail means is curved in a side view in such a manner as to protrude outward, and wherein said screen means is curved in such a manner as to protrude upward.

\* \* \* \* \*